(12) United States Patent
Almgren

(10) Patent No.: US 10,803,049 B2
(45) Date of Patent: *Oct. 13, 2020

(54) METHOD FOR CREATING SIGNALS FOR TIME-STAMPING OF DOCUMENTS AND METHOD FOR TIME-STAMPING OF DOCUMENTS

(71) Applicant: Enigio Time AB, Stockholm (SE)

(72) Inventor: Hans Almgren, Täby (SE)

(73) Assignee: ENIGIO TIME AB, Stockholm (SE)

( * ) Notice: Subject to any disclaimer, the term of this patent is extended or adjusted under 35 U.S.C. 154(b) by 113 days.

This patent is subject to a terminal disclaimer.

(21) Appl. No.: 14/909,918

(22) PCT Filed: Aug. 7, 2014

(86) PCT No.: PCT/SE2014/050920
§ 371 (c)(1),
(2) Date: Feb. 3, 2016

(87) PCT Pub. No.: WO2015/020599
PCT Pub. Date: Feb. 12, 2015

(65) Prior Publication Data
US 2016/0188907 A1    Jun. 30, 2016

(30) Foreign Application Priority Data
Aug. 8, 2013   (SE) ...................................... 1350947

(51) Int. Cl.
*G06F 16/23* (2019.01)
*G06F 16/93* (2019.01)
(Continued)

(52) U.S. Cl.
CPC ...... *G06F 16/2365* (2019.01); *G06F 11/1451* (2013.01); *G06F 16/2379* (2019.01);
(Continued)

(58) Field of Classification Search
None
See application file for complete search history.

(56) References Cited

U.S. PATENT DOCUMENTS

| 4,309,569 A | 1/1982 | Merkle |
| 5,136,646 A * | 8/1992 | Haber ................... H04L 9/3265 |
| | | 380/30 |

(Continued)

FOREIGN PATENT DOCUMENTS

| CA | 2317139 A1 | 3/2001 |
| EP | 0932109 A2 | 7/1999 |

(Continued)

OTHER PUBLICATIONS

Electronic Signatures and Infrastructures (ESI); Policy and Security Requirements for Trust Service Providers Providing Time-Stamping Services; ETS Draft; ESI-0019421-2v001; Nov. 11, 2013.

(Continued)

*Primary Examiner* — Kambiz Zand
*Assistant Examiner* — Arezoo Sherkat
(74) *Attorney, Agent, or Firm* — Tucker Ellis LLP

(57) ABSTRACT

Method for creating a signal for time-stamping of documents (A), comprising the following steps: a) selecting a digitally stored reference document (D1-D3), which is a digital sample of the current state of a certain reference source at a certain first point in time, where the truthfulness of each reference document can be verified by consulting one or several publically available information sources concerning the historic state of said reference source; b) using the reference document as an input values to a one-way function, and calculating the corresponding output value; c) updating the signal based upon the said output value, so that the said output value (P1-P3) is constituted by or can be determined based upon the value of the signal; and d) repeating from a) using another digitally stored reference (Continued)

document which is a sample of the current state of the same or another reference source at a subsequent point in time.

18 Claims, 11 Drawing Sheets

(51) Int. Cl.
*H04L 9/32* (2006.01)
*G06F 21/64* (2013.01)
*G06F 11/14* (2006.01)

(52) U.S. Cl.
CPC .............. *G06F 16/93* (2019.01); *G06F 21/64* (2013.01); *H04L 9/321* (2013.01); *H04L 9/3247* (2013.01); *H04L 9/3297* (2013.01); *G06F 2201/84* (2013.01)

(56) References Cited

U.S. PATENT DOCUMENTS

| | | | |
|---|---|---|---|
| 5,136,647 A | 8/1992 | Haber | |
| 5,606,609 A * | 2/1997 | Houser | H04L 9/3236 382/306 |
| 5,781,629 A * | 7/1998 | Haber | H04L 9/3236 713/177 |
| 6,381,696 B1 | 4/2002 | Doyle | |
| 6,742,119 B1 | 5/2004 | Peyravian | |
| 6,868,406 B1 * | 3/2005 | Ogg | G07B 17/00193 705/401 |
| 7,490,241 B1 | 2/2009 | Peyravian | |
| 7,940,160 B2 | 5/2011 | Arakawa | |
| 8,312,284 B1 | 11/2012 | Zheng | |
| 9,754,131 B2 * | 9/2017 | Wilson | G06F 21/64 |
| 2002/0101994 A1 | 8/2002 | Shinzaki | |
| 2002/0169964 A1 | 11/2002 | Klook | |
| 2003/0159048 A1 * | 8/2003 | Matsumoto | G06F 21/645 713/178 |
| 2004/0093499 A1 | 5/2004 | Arditi | |
| 2005/0144457 A1 | 6/2005 | Lee | |
| 2005/0157871 A1 * | 7/2005 | Komano | H04L 9/302 380/28 |
| 2006/0080536 A1 * | 4/2006 | Teppler | H04L 9/12 713/176 |
| 2006/0101269 A1 * | 5/2006 | Moskowitz | G06F 21/10 713/176 |
| 2007/0179748 A1 * | 8/2007 | Kanai | G11B 20/00086 702/187 |
| 2007/0201702 A1 * | 8/2007 | Hendricks | G06F 21/10 380/282 |
| 2007/0208944 A1 | 9/2007 | Pavlicic | |
| 2008/0028220 A1 * | 1/2008 | Wyssen | G07D 7/20 713/176 |
| 2009/0067667 A1 | 3/2009 | Jabri | |
| 2009/0083372 A1 * | 3/2009 | Teppler | H04L 9/3226 709/203 |
| 2009/0100041 A1 * | 4/2009 | Wilson | G06F 16/2365 |
| 2010/0161993 A1 * | 6/2010 | Mayer | G06F 21/64 713/178 |
| 2011/0078458 A1 * | 3/2011 | Furukawa | G06F 21/64 713/189 |
| 2011/0231645 A1 * | 9/2011 | Thomas | H04L 9/321 713/150 |
| 2012/0293840 A1 * | 11/2012 | Wilson | G06F 21/64 358/1.15 |
| 2013/0110978 A1 * | 5/2013 | Gordon | H04N 21/2665 709/218 |
| 2013/0276058 A1 * | 10/2013 | Buldas | G06F 21/64 726/2 |
| 2014/0280377 A1 * | 9/2014 | Frew | G06F 17/241 707/805 |
| 2014/0359036 A1 * | 12/2014 | Blakers | H04L 51/26 709/206 |
| 2015/0006952 A1 * | 1/2015 | Trichardt | G06F 11/1092 714/6.3 |
| 2016/0043867 A1 * | 2/2016 | Bonsignore | H04W 12/06 713/168 |
| 2016/0294633 A1 * | 10/2016 | Dragon | H04L 43/04 |
| 2016/0357989 A1 * | 12/2016 | Wilson | G06F 21/64 |

FOREIGN PATENT DOCUMENTS

| | | |
|---|---|---|
| JP | 2001022848 A | 1/2001 |
| JP | 2008216342 A | 9/2008 |
| WO | 1999/035785 A1 | 7/1999 |
| WO | 2006/075566 A1 | 7/2006 |
| WO | 2007/072468 A1 | 6/2007 |
| WO | 2013008778 A1 | 1/2013 |

OTHER PUBLICATIONS

International Search Report from counterpart International Patent Application No. PCT/SE2014/050920, dated Dec. 1, 2014.
Supplementary European Search Report from corresponding European Application No. 14834523, dated Mar. 24, 2017.
Jerman Blazic Services (LTANS) Setcce S 1-15 Saljic Setcce T Gondrom A: "Extensible Markup language Evidence Record Syntax; draft-ietf-ltans-xmlers-11.txt", Internet Engineering Task Force , 1ETF; Standardworkingdraft, lnternet Society (1SOC) 4, Rue Des Fala1ses CH—1205 Geneva, Switzerland, No. 11, Jan. 24, 2011 (Jan. 24, 2011), pp. 1-58.
Buldas, Ahto et al., "Digital Signatures, timestamping and the corresponding infrastructure", Jan. 6, 1998, 7 pages.

* cited by examiner

METHOD FOR CREATING SIGNALS FOR TIME-STAMPING OF DOCUMENTS AND METHOD FOR TIME-STAMPING OF DOCUMENTS

For applications in the physical domain, there are many known methods for time-stamping and protecting the integrity of documents, such as letters. Such methods comprise, for instance, signatures, seals, public notarization arrangements and so on. The verification of such time stamps and integrity-protecting arrangements often depends on the continuous, traceable and non-reversible nature of physical domain matter.

In the digital domain, where matter is of discreet, not always traceable and often reversible nature, there are other types of problems that need to be dealt with in order to be able to time-stamp and protect the integrity of information.

Various types of cryptographic methods, in which only persons controlling certain cryptographic keys have access to certain information, have been developed during the recent decades for use in the computerized digital domain.

Some cryptographic methods use one-way functions, such as certain hash functions, in order to create such cryptographic keys. One advantage of one-way functions of sufficient quality is that it is practically impossible to calculate the data input to the one-way function given an output value of the one-way function, why the existence of a certain cryptographic key can be used as proof of the pre-calculation existence of the said input data.

One known technology is linked time-stamping, in which several digitally stored documents are hashed at consecutive points in time, and wherein each hash includes the hash of a previous document by concatenation. Periodically, such hashes are published in widely available publications such as newspapers. Since the existence of each linked hash implies the previous existence of the information upon which the hash is based, such a method makes it practically impossible to back-date a certain document, within the limits of publication frequency. Also, the order of document creation can be protected. See for instance WO 2007/072468 A1.

Furthermore, it is known to use so-called Merkle trees in this type of applications. A Merkle tree is a tree structure in which the label of each node is a one-way function output value of a concatenation of each of the node's children nodes' labels. This provides a fast way to verify the integrity of large sets of data if the root node label is received from a trusted source. See, for instance, U.S. Pat. No. 4,309,569 and EP 0932109 A2.

Other prior art related to the present invention includes the following:

U.S. Pat. Nos. 5,136,646 and 5,136,647 both disclose ways to time-stamp documents, in which a providing party uses a one-way function to create a verifiable code comprising a current time-stamp. The methods are recursive and uses previously time-stamped documents.

U.S. Pat. No. 6,381,696 B1 discloses a method for authentication documents, wherein transient cryptographic keys are used, which keys are only valid during a certain respective time interval and are then destroyed.

U.S. Pat. No. 6,742,119 B1 and U.S. Pat. No. 7,490,241 B1 both disclose methods for time-stamping a document, whereby a central party having a trusted clock validates a time-stamp made by a document creating party.

U.S. Pat. No. 8,312,284 discloses a method for time-stamping a document, such as a digital photograph, wherein the document is enveloped by an earlier and a later time-stamp.

US 2007/0179748 A1 discloses a measurement means with built-in capabilities to time-stamp measurement values continuously using a private key.

US 2009/0067667 A1 discloses a method for protecting the integrity of image metadata by incorporating a coded version of such metadata in a watermark in the image.

WO1999/035785 A1 discloses various ways of protecting the integrity of and time-stamping documents across multiple revisions and using one-way hash functions.

WO2006/075566 A1 discloses methods for guaranteeing the authenticity of images documenting for instance insured property, including digital processing and specifically-adapted recording equipment.

JP 2008/216342 A discloses a method for verifying the authenticity of a forensic analysis of a computer HDD, whereby the analysis is captured on film. Chained hash functions are used to guarantee synchronization.

JP 2001022848 discloses a digital notarization method for proving authenticity and time for electronic documents.

CA 2317139 discloses a method for time-stamping an electronic document, wherein a combined digest is calculated for a plurality of documents.

One problem with the prior art is to afterwards be able to determine, in a trustworthy way, that a document was indeed time-stamped after a certain historic point in time. For such determination, it is in some cases not sufficient that a trustworthy third party simply states that this was the case.

The present invention solves the above described problems.

Hence, the present invention relates to a method for creating a signal for time-stamping of documents, characterised in that the method comprises the following steps: a) selecting a digitally stored reference document, which reference document is a digital description or sample of the current state of a certain physical reference source and/or information reference source at a certain first point in time, where the truthfulness of each reference document can be verified by consulting one or several publically available information sources concerning the historic state of said reference source; b) using the reference document as one of at least one input values to a one-way function, and calculating the corresponding output value of the one-way function; c) updating the signal based upon the said output value, so that the said output value is constituted by or can be determined based upon the value of the signal; and d) repeating from a) using another digitally stored reference document which is a digital description or sample of the current physical state and/or information state of the same or another reference source at a subsequent point in time.

In the following, the present invention will be described in detail, with reference to the following drawings.

Figure 7A:
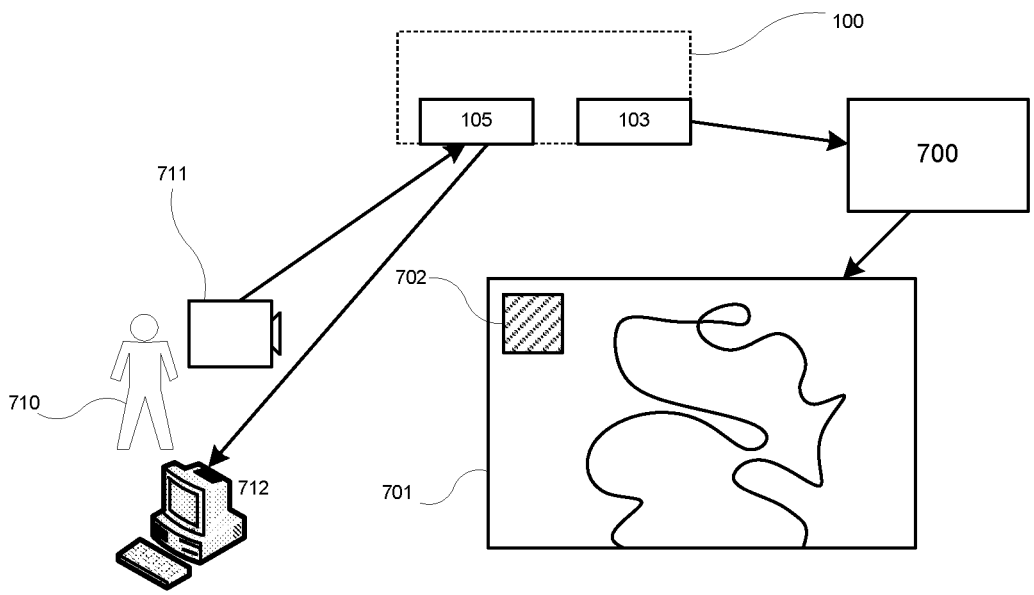
Figure 7B:
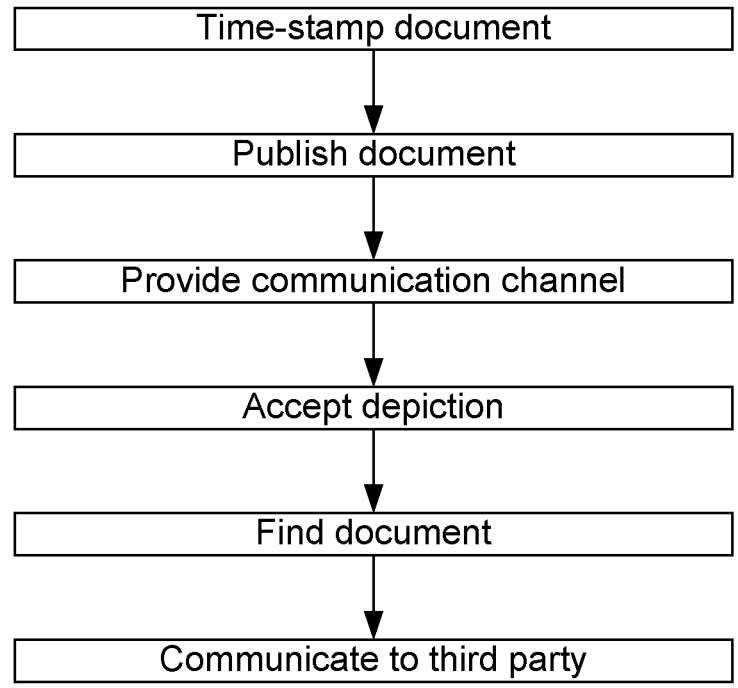
Figure 8A:
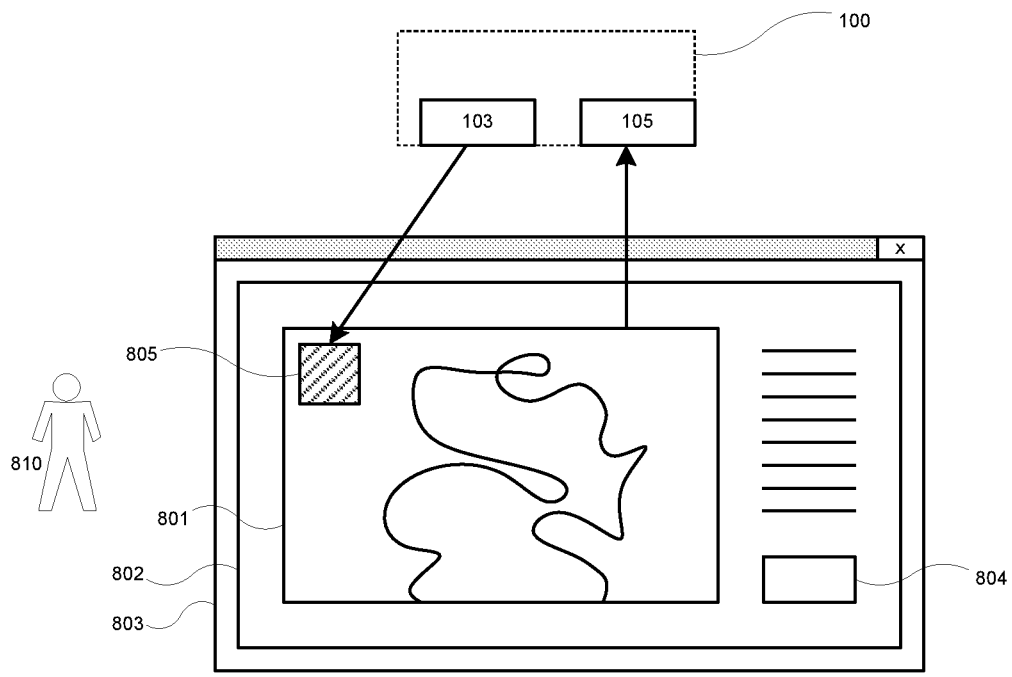
Figure 8B:
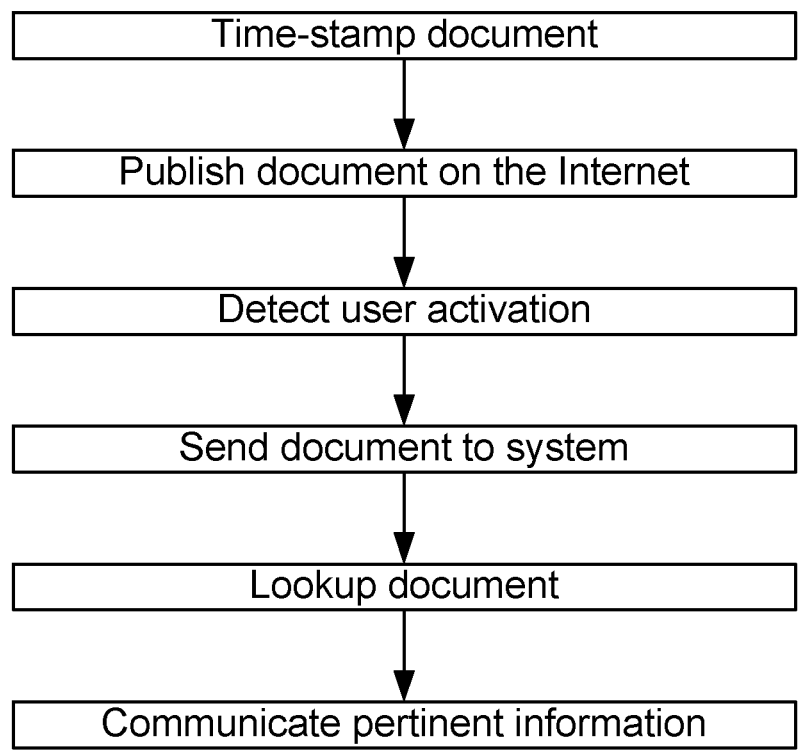
Figure 8C:
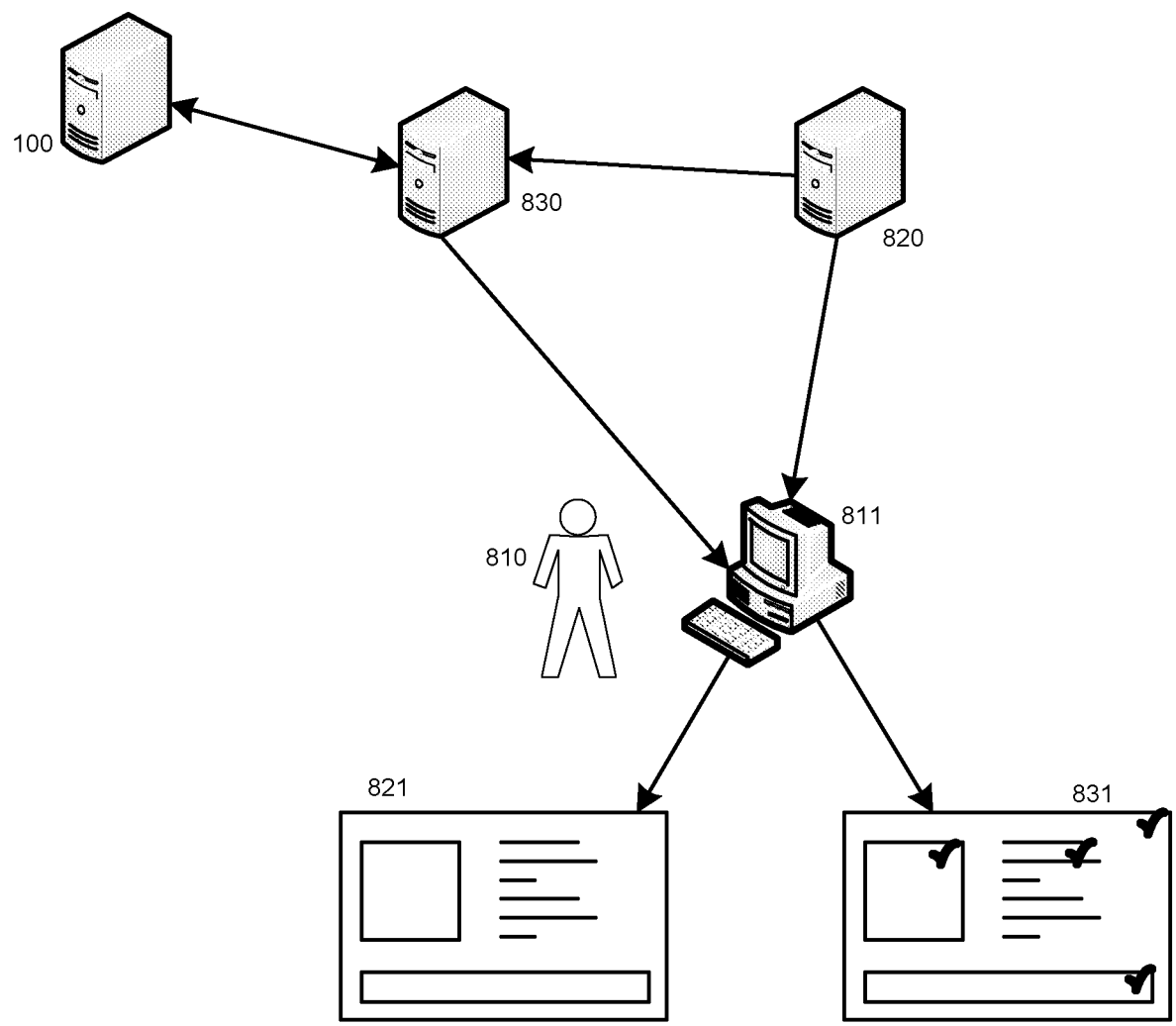
Figure 9A:
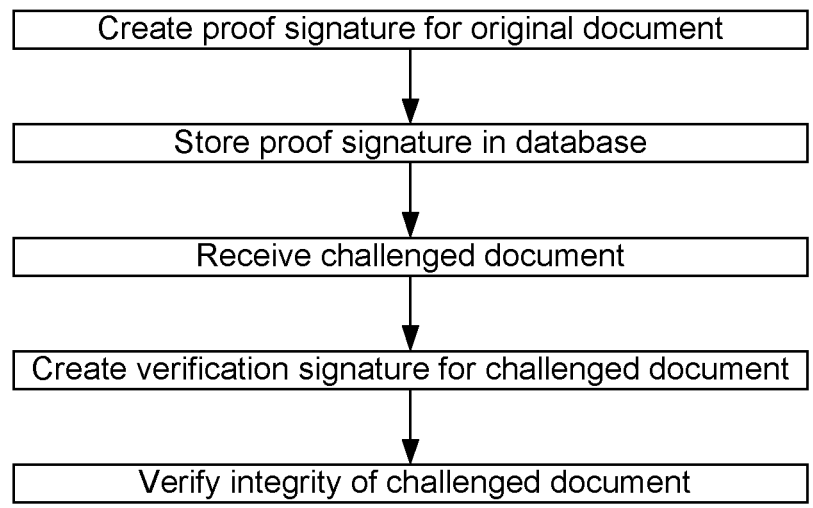
Figure 9B:
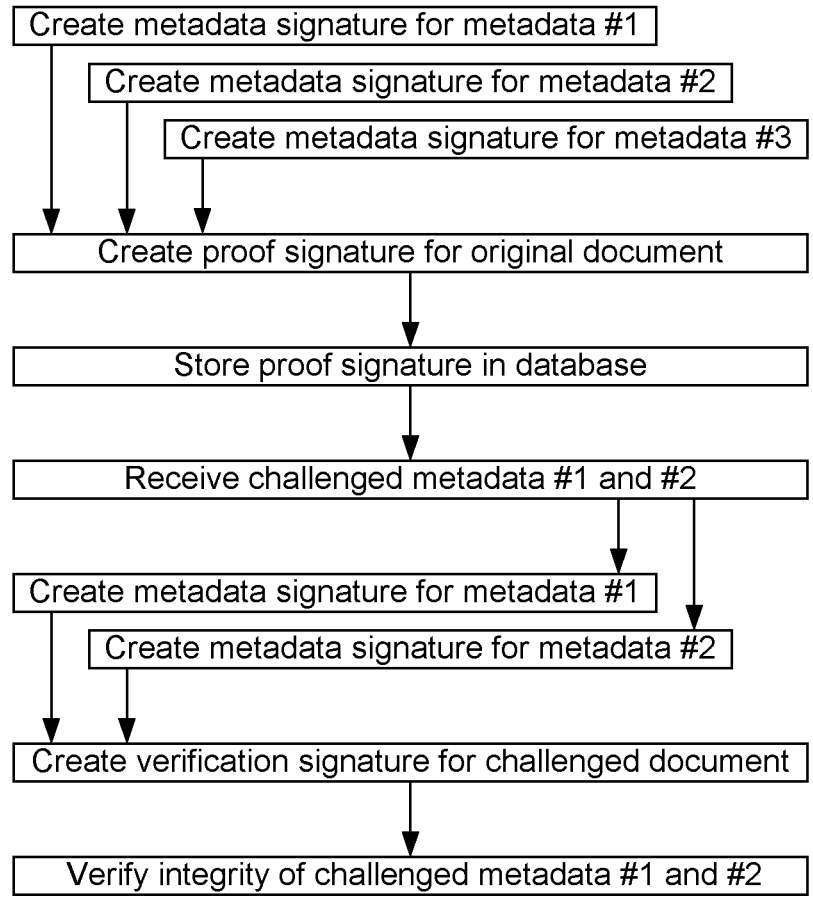
Figure 10:
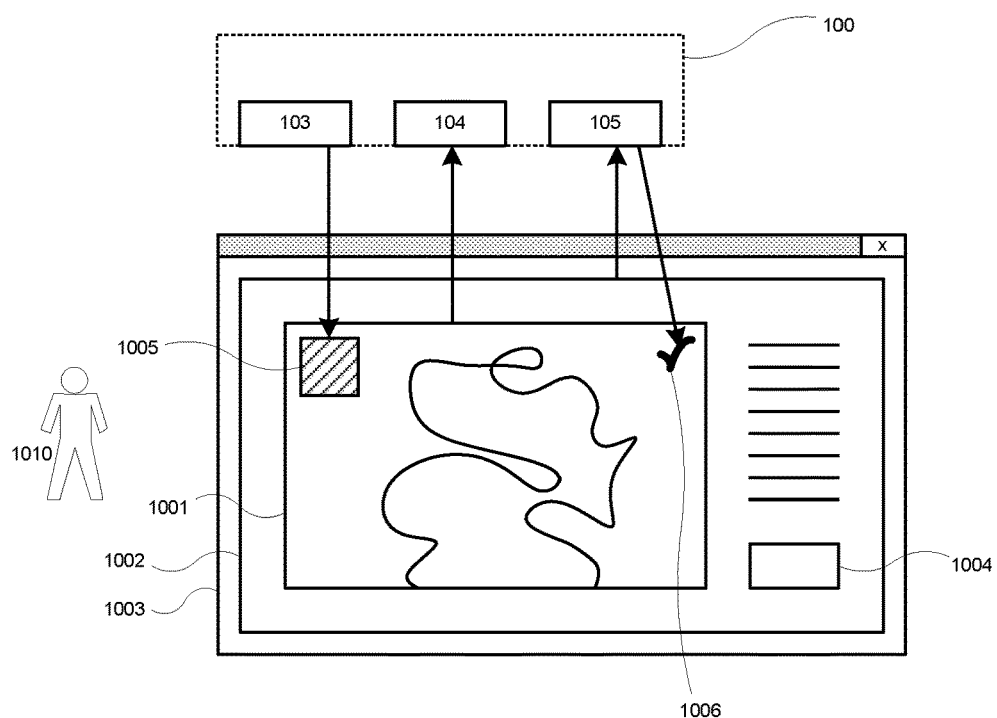
Figure 11:
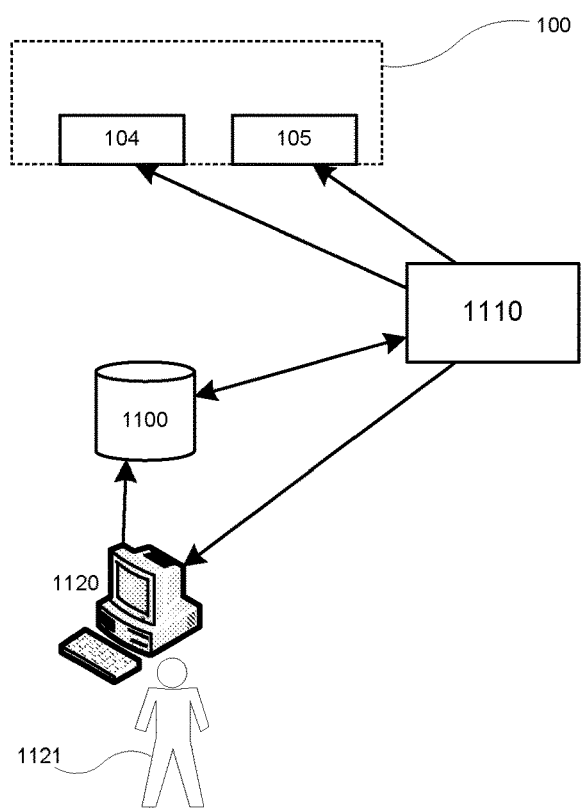

FIGS. 7a and 7b schematically illustrate a method of providing a way to verify the integrity of a document according to the invention;

FIGS. 8a and 8b schematically illustrate a method of providing a way to verify the integrity of a document according to the invention, which document is published on the Internet;

FIG. 8c schematically illustrates a webpage filtering method according to the present invention;

FIGS. 9a and 9b illustrate respective method steps for verifying the integrity of a document and associated data, respectively;

FIG. 10 schematically illustrates a method according to the present invention for proving that an information stream is provided in realtime; and FIG. 11 schematically illustrates a method for verifying the integrity of data in a database.

All figures share the same reference numerals and denotations for similar or like components.

Herein, the following terms are used with the following respective meanings:

A "document" means a piece of information, such as a text, an image, a piece of audio, a moving image such as a film or the like, or a combination of several such pieces of information, which is either digitally stored or capable of being sampled and then stored in digital form.

To "sample" a document means converting a document from analogue form to digital form. To "sample" a real-world phenomenon means converting analogue information gathered in relation to said phenomenon and converting such gathered information into digital form. Alternatively, to "sample" may mean receiving or fetching digital information representing or constituting a document which has already been converted into digital form or which exists in the digital domain.

"Time-stamping" a document means introducing or creating a piece of information, which piece of information is stored in association with the document as a part of the document or in a way that can be securely re-associated with the document, and that provides a way to, at a later point in time, determine a time at which the time-stamping occurred. One example of such time-stamping is to create a signature (see definition below) of the document and to store the signature and associate it with the document in question.

A "reference source" is a certain well-defined source of information which can be sampled, described or used as-is in order to produce a reference document describing a current state of the reference source. Examples of reference sources include the current quotes for certain predefined exchange-traded stock; the current standing in a sports game; the currently viewed image frame in a publically broadcast live television program or a currently broadcast audio signal in such program or a publically broadcast live radio program; and the current front page of a newspaper published on the Internet.

A "reference document" is a digital sample, description or snapshot of the current state, at a certain point in time, of a certain reference source with which the reference document is associated. A reference document is "externally provided" in the sense that the reference source is a source which is external to the system 100.

A "one-way function" is a function the input value of which is, in practice, impossible to determine based only upon the corresponding function output value, and which is substantially one-to-one in the sense that in the practical applications described herein, two different input values will in practice always result in two different output values. Examples include many hash functions which are conventional as such, such as SHA hash functions, such as SHA-1, SHA-2 and SHA-3, as well as MD5.

A "publically published" piece of information or document is published in such a way so that it is readily available to a wide enough audience, and with sufficient persistence over time, so that a third party is likely to be able to verify the time of publication and the contents of the piece of information or document exactly as they were at the date and time of publication, even if some time, such as several years, has passed after the publication.

A "signature" of a document is a value created so that it is constituted by, comprises or is calculated based upon the output value of a certain signature one-way function, to which at least a part of the document is one of one or several input values, in such a way so that the signature is substantially impossible to calculate without having access to relevant information about the document.

A "proof signature" is a signature calculated for a document in order to, at a later point in time, be able to prove access to relevant information about the document at the time of the creation of the proof signature.

A "verification signature" is a signature created in relation to a certain document for comparison with a proof signature which has been calculated earlier.

A "digitally coded watermark" is a piece of information which is encoded into a digitally stored document in such a way so that it is only visible or noticeable when observing the document under certain predetermined conditions, such as when subjecting the document to certain algorithms, and which otherwise only has a negligible or unnoticeable effect on the document.

Figure 1:
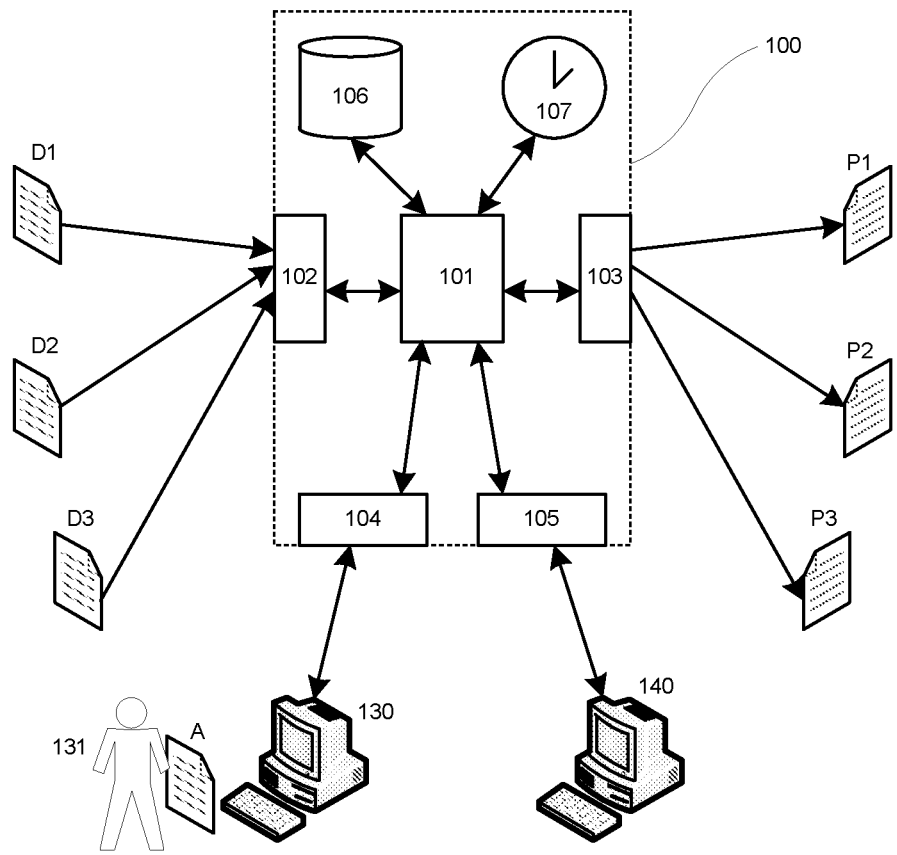
FIG. 1 is an overview of a system for carrying out a method according to the present invention.

FIG. 1 shows a system 100 according to the present invention, comprising a central control device 101 and the following digital interfaces:

a document reading interface 102, arranged to read different reference documents D1, D2, D3, preferably reference documents of several different types and associated with different reference sources;

a time-stamping signal publishing interface 103, arranged to publish a time-stamping signal value in the form of a time sequence of values as embodied in different documents P1, P2, P3, preferably documents of several different types, published at consecutive points in time, which interface 103 may also be capable of communicating a time-stamping signal value (see below) to third party systems upon request;

a document reception and time-stamp delivery interface 104, arranged to allow a user 131 to, via a computer device 130, deliver a document A to the system 100 for time-stamping, and to deliver a corresponding time-stamp or a time-stamped document to the computer device 130; and a document verification interface 105, arranged to receive verification requests from a computer device 140 and to deliver verification status reports to the computer device 140.

As each document D1, D2, D3 constitutes a respective sampled state of a respective reference source, the interface 102 is arranged to carry out such sampling for one or several reference sources, hence creating reference documents D1, D2, D3, and/or to simply receive such reference documents D1, D2, D3. Similarly, interface 103 may be arranged to simply send documents P1, P2, P3 to one or several publishers, and/or to order the publishing using one or several self-service publishing services.

Each publication P1-P3 should be publically published on at least one channel which is controlled by a third party different from the operator of system 100, preferably on several parallel channels, where each such channel should provide substantially permanent persistence in the sense that documents P1-P3 and their time and date of publication should be publically accessible even after the lapse of several years after publication; be easily accessible by a large number of third parties; be easily referred to; and preferably be immutable to the party ordering the publishing. Examples include various Internet publication channels, such as popular blog platforms, Twitter (registered trademark), video publishing sites such as YouTube (registered trademark), news sites, e-mails to predetermined recipients; paper publications such as newspapers and bulletins; broadcast media such as radio, TV, Text TV, etc.; and telecom platforms such as SMS (Short Message Service) to predetermined recipients.

Each such channel should provide the possibility for a broad spectrum of third parties to, at a later point in time, preferably at least several years after the publication time, verify the publication time of the published information.

Preferably, at least ten different platforms should be used in parallel, preferably at least ten platforms which are independent from each other in terms of common ownership and control, preferably also under different legislative rule.

The system 100 furthermore comprises a database 106 and a clock 107, both of which, together with interfaces 102, 103, 104, 105, are in communication with the central control device 101. The clock 107 may be internal to the system 100, and in that case periodically synchronized with an external, trusted clock, but preferably the clock 107 is in the form of a clock signal received from a trusted external party.

The system 100 is implemented as a computerized device, which may as such comprise one or several interconnected computers, and the functionality of which is implemented as suitable hardware and/or software logic. Computer devices 130, 140 in FIG. 1, as well as other computer devices depicted in other figures herein, are merely illustrative, and may be one or many computers, mobile telephones, computer networks or any other type of device capable of automated communication across digital interfaces 104, 105.

Figure 2:
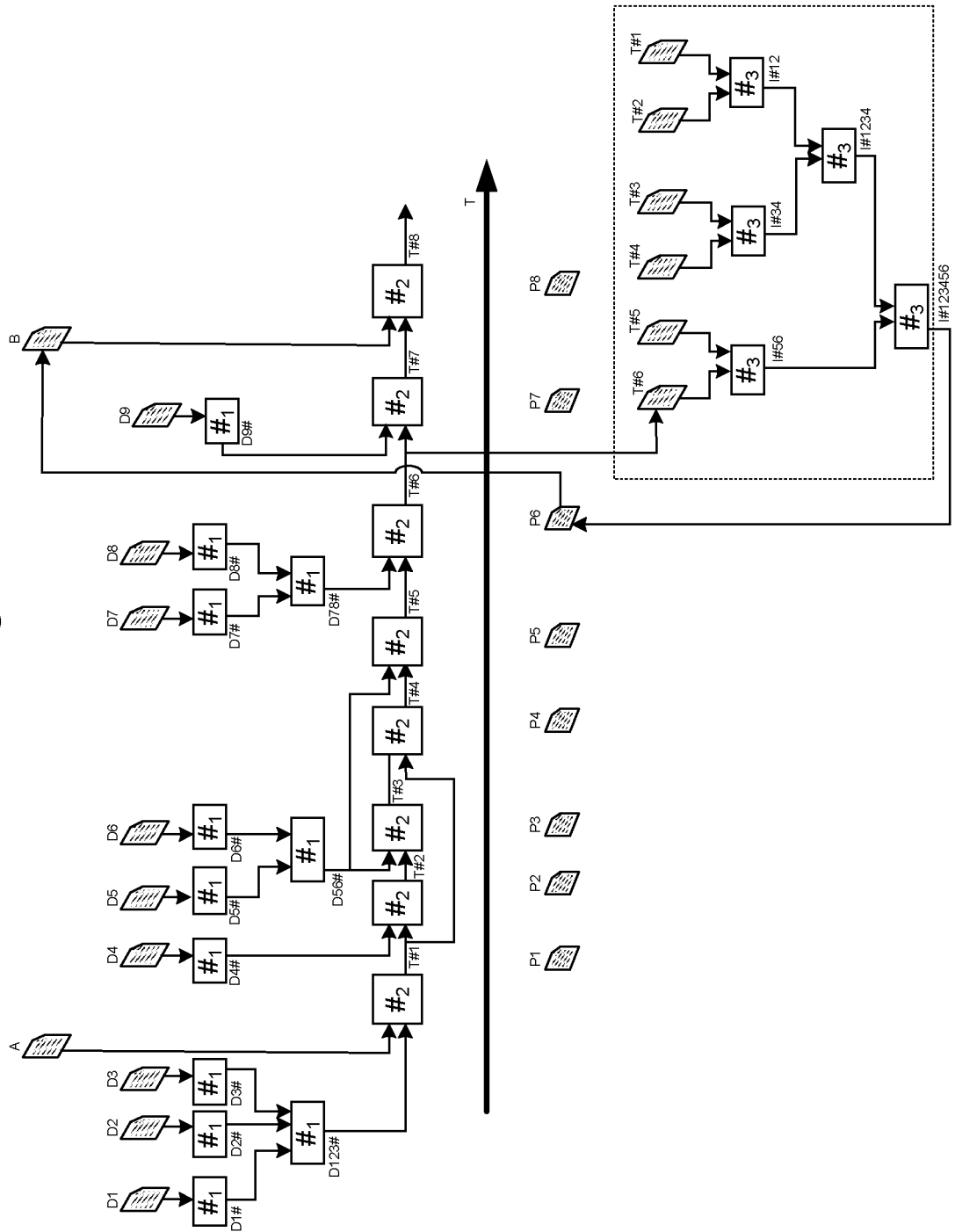
FIG. 2 is an overview of a method for creating a signal for time-stamping of documents according to the present invention.

FIG. 2 is a simplified illustration of a method according to the present invention. The arrow T represents time, and the various events illustrated in FIG. 2 are ordered in the way shown, apart from the one-way function tree shown to the bottom right, within a broken lines box. The latter one-way function tree rather represents an instantaneous state of a certain one-way function structure at the time just before the publishing of P6. An example of such a one-way function tree is a conventional hash tree.

In FIG. 2, A, B and D1-D9 represent different digitally stored reference documents; D1#-D9# represent respective output values of a certain one-way function the respective input value of which is the respective reference document D1-D9; T#1-T#8 represent respective values of a signal according to the present invention for time-stamping of documents, or intermediate values for calculating such signal values; and P1-P8 represent published respective values for such a signal for time-stamping of documents. Hence, either T#1-T#8 or P1-P8 can be used as the time-stamping signal (described below). If T#1-T#8 are used as the time-stamping signal, they are preferably published in a way corresponding to the one described herein in relation to P1-P8. Irrespective of which stream of values are used as the time-stamping signal, this signal should be frequently updated, well-defined and stored in database 106, so that it is possible to later verify the historic values of the time-stamping signal.

A and B are digitally stored documents, such as texts, word-processing documents, images, video films and so on, provided by the user 131 to the system 100; and D1-D9 are documents automatically selected by the system 100 based upon predetermined associations between the system 100 and the corresponding reference sources.

$\#_1$, $\#_2$ and $\#_3$ represent respective one-way functions. The one-way function $\#_1$ used for producing D1#-D9# is not necessarily the same as the one-way function $\#_2$ used to produce T#1-T#8 or $\#_3$ to produce P1-P8. Even if it is preferred that the same one-way function is for instance used to produce all output values D1#-D9#, it would be possible to change the one-way function used if information regarding what one-way function was used for what operation and when was stored in database 106 for later reference. Each one-way function may be a single function or an aggregate of functions, also accepting other input than the inputs shown in FIG. 2, as long as such an aggregate in itself constitutes a one-way function with an output value which may be deterministically recalculated at a later point in time, given all the used input values.

Figure 3:
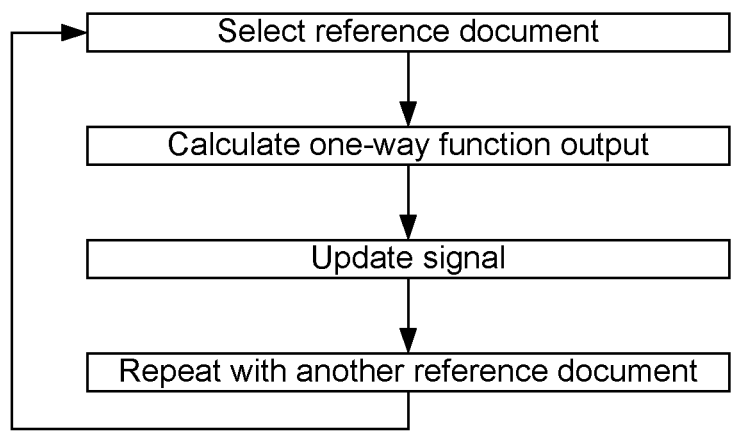
FIG. 3 shows method steps of a method according to the present invention to produce a time-stamping signal.

FIG. 3 illustrates the method steps of a method for creating a signal for time-stamping of documents according to the present invention. Such a signal may, for instance, be in the form of an alphanumerical value or a graphical code, such as a QR- or bar code, representing such a value, or have any other type of information format, and is published, transmitted, publishable or transmittable.

In a first step, a digitally stored reference document A, B, D1, D2, D3, D4, D5, D6, D7, D8 or D9 is selected. The reference document is a digital description or sample of the current state at a certain first point in time of a certain reference source. The truthfulness of each reference document can be retrospectively verified by consulting one or several publically available information sources concerning the historic state of said reference source.

The current state of one and the same reference source can be sampled at several consecutive points in time, to thus create several different reference documents. That the reference document is "selected" means that a reference source is selected and that the digitally stored reference document is obtained, such as by directly sampling the state of the reference source, by reading the current state of the reference source or by receiving a digital representation of the current state of the reference source.

In a next step, as illustrated in FIGS. 2 and 3, a one-way function, such as an aggregate of several one-way functions, is employed and an output value of the one-way function is calculated for certain input data. According to the invention, the selected reference document is used as one of at least one input values to the one-way function.

In FIG. 2, several different possible alternatives for the one-way function are illustrated. For instance, for document A, the one-way function is $\#_2$, and the corresponding output value T#1 is calculated using D and D123#, which latter in itself is the output value of a previously used one-way function $\#_1$ and depending upon documents D1-D3. A and D123# can, for instance, be concatenated before being used as one single input value into $\#_2$, or $\#_2$ can be designed to accept at least two input parameters. For document D4, the one-way function is constituted by the respective one-way functions $\#_1$ and $\#_2$, which are used in series. For documents D1, D2 and D3, $\#_1$, $\#_1$ and $\#_2$ are used in series, with intermediate input of other input parameters D1#, D2# and D3#, respectively.

Hence, the one-way function may be a single one-way function or an aggregate of several one-way functions, and the same one-way function or aggregate of one-way functions may or may not be used for all reference documents A, B, D1-D9. The important thing is that the reference document in question is an input parameter to the one-way function in the sense that it is practically impossible to calculate the output value without knowing the value of the corresponding reference document in question. Hence, other information, such as other one-way function output values, may also be used as input parameters into the one-way function when calculating the corresponding output value. Preferably, all input values, and their use, are stored, preferably in database 106, for easy re-calculation of the output value at a later point in time.

In a next step, the time-stamping signal is updated based upon the said calculated output value, so that the said output value is constituted by or can be determined based upon the value of the signal.

In the exemplifying embodiment illustrated in FIG. 2, the signal value is published as documents P1-P8, after additional calculations based upon values T#1-T#8 as described below. However, in alternative embodiments, the values T#1-T#8 can constitute the signal value themselves. The important thing is that it at a later point in time is possible to derive each corresponding published signal value T#1-T#8 or P1-P8 based upon sufficient knowledge about the reference documents A, B, D1-D9 and any other information used when calculating the sequence of time-stamping signal values, and how these calculations were made.

FIG. 2 illustrates, in the broken line box, the specific calculation of P6. In the exemplifying embodiment illustrated in FIG. 2, a corresponding calculation is made, at each respective point in time, for each published signal value P1-P8. A tree structure, such as a conventional hash tree, is grown step by step as new one-way function output values T#1-T#8 are calculated.

Said values T#1-T#8 are logically stored as leaves in the tree structure. Then, a certain tree one-way function $\#_3$ is used to digest the leaf values T#1-T#8 layer by layer in the tree until a tree root is reached, which tree root depends, via the tree one-way function $\#_3$, on each leaf which is an ancestor to the said tree root. More specifically, for each parent node a respective output value of the tree one-way function $\#_3$ is calculated, where the respective one-way function $\#_2$ output signal value and/or calculated tree one-way function $\#_3$ output value of each respective child node for the parent node in question are used as input values for the tree one-way function $\#_3$ for that parent node. Hence, T#1 and T#2 are used as input values to the tree one-way function $\#_3$, producing output value I#12. I#12 is used, together in turn with output value I#34, calculated with T#1 and T#2 as input values, to, again via one-way function $\#_3$, calculate output value I#1234. Finally, I#1234 is used, together with I#56, to, via one-way function $\#_3$, calculate I#123456 which constitutes the tree root output value.

It is then this root value I#123456, at the point after adding T#6 and recalculating the tree, which is published as P6. The corresponding may be true regarding values T#1-T#5, T#7-T#8 and published documents P1-P5, P7-P8, respectively.

In other words, it is the tree one-way function output value of the tree root, or a value which has been calculated based upon this output value, which is publically published as P6.

Hence, only the leaf nodes contain one-way function output values that are input to the tree, and each parent node is a one-way function digest of its children. The tree is grown by adding more children and then recalculating the corresponding part of the tree, ending up with a new root node.

Then, in a next step the procedure is repeated, and another digitally stored reference document is selected, which reference document is a digital description or sample of the current physical and/or information state of the same or another reference source at a subsequent point in time. Hence, after processing for instance reference document D4, resulting in the calculation of T#4 and the publication of P4, reference document D5 is processed, resulting in the calculation of T#5 and the publication of P5. As a result, the tree grows by one additional leaf node, namely T#5. This way, the tree may eventually grow very large, potentially comprising all previous T# values since the start of the method. Still, it is computationally cheap to process the tree, since only a limited subset of the tree needs to be modified in order to for instance add a node, and a verification only involves the respective tree branch.

As the tree grows, more leaf nodes are added, and as a consequence the number of parent node layers will grow. However, since the capacity of the tree grows exponentially with the number of layers, only a limited number of layers will be needed even for very large numbers of stored leafs, such as several billions of leafs or even substantially more.

It is preferred that all, or at least most, calculated time-stamping signal values since the start of the method are stored in the tree, and that each tree root which is publically published depends upon all previously calculated signal values.

It is furthermore preferred that at least 8 child nodes are associated with each parent node before the parent node is considered full.

As the tree grows so that a new layer is created, the previous root node becomes a child node in the new, grown tree, and a new root node is introduced.

The reference sources used can be of different types. According to one preferred embodiment, at least one reference source is a set of specified publically published intangible information, the state of which is not known beforehand. Examples of such reference sources include a set of stock exchange quotes from one or several officially recognized stock exchanges; a set of winning lottery numbers from major lotteries; or randomly selected data published by third parties on a widely used publically accessible publishing platform such as YouTube (registered trademark) or Twitter (registered trademark). That the state of the reference source "is not known beforehand" is to be interpreted so that it would have been substantially impossible to foresee the state before the actual point of sampling or selection of the reference document, in the sense that the output value of a one-way function accepting the selected reference document as input value would have been practically impossible to predict before the time of selecting the reference document.

According to one preferred embodiment, at least one reference source is, in a corresponding way, a publically published, tangible physical event, the state of which is not known beforehand. Examples comprise a predetermined specific sports event, where a corresponding reference document is captured imagery or audio from the sports event, for instance from a predetermined broadcaster, or results data; specified news coverage, where the reference document is imagery or audio from a predetermined covering news broadcast, text material from a predetermined publisher covering the news event, or statistical data related to the news event; meteorological data; data from publically published scientific progress data from a specified field, such as space exploration; and so on.

Combinations of such sources may also of course be used in parallel. The important thing is that each reference source and the method of selecting the corresponding reference document are sufficiently well-defined so that it is possible to determine the actual and specific historic value of the reference document at a later point in time, such as more than one, or preferably several, year after the time of selecting the reference document in question. However, it is realized that even if some, or even most, of the reference sources become unavailable for retroactive inspection after some time, a method according to the present invention will still be able to perform trustworthy verification of document time-stamps and the related verification tasks as described herein due to the redundancy provided by using sufficiently many disparate reference sources.

In order to aid in such later re-constructing of the reference document, at least one, preferably all, of the reference documents A, B, D1-D9, preferably together with any other data used as input values to the one or several used respective one-way function(s), are associated with the respective calculated one-way function output value D1#-D9#, D123#, D56#, D78#, T#1-T#8 and/or the updated and published signal value P1-P8, and the reference document, possibly along with the additional information, is preferably also stored in database 106 for future reference. Also, it is preferred that the time of creation and/or selection of each reference document D1-D9 is stored in database 106, and associated with the respective reference document.

Using a method according to the present invention, a time-stamping signal is achieved which can be used for time-stamping, so that time-stamps retroactively can be proven not to have existed before a certain point in time. Namely, there is no practical way to foresee the exact composition of a certain reference document, such as D7, before the sampling of the corresponding reference source and thereby the creation of D7. Since the publication P6 depends on D7 in a one-way type of relationship, P6 could not practically have been calculated before D7 was known. Hence, the time-stamping signal value P6 is guaranteed not to have existed before the time of creation of D7. By verifying that D7 is actually a correct representation of the state of the corresponding reference source at the alleged time of creation or selection of D7, it can be verified that P5 did not exist before this time.

For instance, if a third party requests proof that P6 did not exist before an alleged creation time of D7, the provider of the time-stamping signal only has to provide the third party with the values D8#, T#5, I#1234, as well as what one-way function or functions #$_1$, #$_2$, #$_3$ used. Then, the third party can carry out the calculations and hence verify that, to satisfactory statistical certainty, no other reference document than D7 could have produced the published value P6. It is noted that the third party does not have to be provided with the actual values of any other documents, such as A or D1-D6 or D8. It is sufficient to provide corresponding one-way function outputs. This is advantageous, since some reference document information may be classified or sensitive.

Hence, a method according to the present invention for verifying that a time-stamping signal value, calculated in accordance with the present invention, comprises providing to a requesting party information regarding a publically published digitally stored reference document of the above described type, which could not have been produced before a certain point in time, as well as a specification of any one-way function or functions used to calculate the time-stamping signal value and any input variables used for such calculations apart from the said reference document.

A time-stamping signal according to the present invention can, for instance, be used to guarantee the freshness of a document which is time-stamped using the signal. This and other applications are described in greater detail below.

According to one particularly preferred embodiment, at least one, preferably several, of the reference sources are of types the respective state of which typically changes very frequently, preferably several times every second. An example of this is that the reference source is predetermined and unambiguously defined video footage, such as video footage from a predetermined video camera; broadcast by a predetermined broadcasting station; or the like. Preferably, the video footage is publically available, for instance over a broadcasting network or via the Internet. In this case, the individual frames of the video stream, or clusters of such frames, and/or an associated audio stream, are used as reference documents. Using such often-updated and often-sampled reference source makes it possible to provide a time-stamping signal which is updated often, and which hence provides fine timeline granularity.

Moreover, it is preferred that the current value of the signal is continuously or periodically published, as shown in FIGS. 1 and 2, in form of documents P1-P8. The signal may also continuously or periodically be sent to a predetermined receiver. "Continuously" is here to be interpreted so that the signal is published or sent as soon as the signal value changes, and/or at a certain minimum periodicity.

Preferably, the signal value is changed, and the updated signal is published or sent, at least once every minute, more preferably at least once every ten seconds, most preferably at least once every second.

According to one preferred embodiment, the adding of a new tree leaf T#1-T#6 does not always automatically lead to the publishing of a new corresponding document P1-P6. New documents may instead be published periodically, irrespective of new additions of leafs, and/or upon the request for a new time-stamping signal value internally from the system 100, for instance with the purpose of time-stamping an incoming document, or from any third party.

In order to obtain better timeline granularity, better robustness, better resilience to organized attacks by third parties or reference source controllers, and higher trustworthiness, it is furthermore preferred that a collection of several different reference sources are used in parallel, and that reference documents representing different reference sources are used as the respective input value to the one-way function #$_1$ in different respective iterations of the method.

It is also preferred that at least some, preferably most, more preferably at least 90%, of the used reference documents, which are per se publically published, are regularly used without the origin of the reference document data being published to third parties, but only disclosed in connection to a verification request from a third party. This adds additional security to the use of the time-stamping signal.

As shown in FIG. 2, there is a feedback relationship between consecutive time-stamping signal values, in the form of a dependence of later time-stamping signal values on previous time-stamping signal values for at least one, preferably most, most preferably substantially all, time-stamping signal values. Hence, such a dependent time-stamping signal value T#1-T#8 or P1-P8 comprises a previous time-stamping signal value T#1-T#7 or P1-P7, in the sense that a previous or current value of the time-stamping signal, a value upon which a previous or current value of the signal is based, or a value calculated based upon such previous or current signal value, is used as an input value to the one-way function or one-way function aggregate which is used to calculate the value of the time-stamping signal value in question.

Such feedback adds redundancy to the time-stamping signal, since some loss of information can be tolerated while still being able to retroactively calculate most time-stamping signal values. Different types of such feedback is exemplified in FIG. 2 in the following ways:

One-way function $\#_2$ output value T#1, which in itself may constitute the value of the time-stamping signal at the time or is merely used to calculate the time-stamping signal value P1, is used as input value into one-way function $\#_2$ in order to produce output value T#4, which as such may constitute the value of the time-stamping signal at that, later, time, or which is merely used to calculate the value of the time-stamping signal P4.

In a similar manner, D56#, which is the output value of one-way function $\#_1$, is used as input value to one-way function $\#_2$ both for the calculation of T#3 and, at a later point in time, T#5. This way, both T#3, P3, T#5 and P5 will depend upon D56#.

Each time-stamping signal value or intermediate value T#2-T#8 depends upon at least one previous such value T#1-T#7 by this value being used as input value into one-way function $\#_2$. This is preferred since it creates a chain of dependence making it very difficult to reproduce the time-stamping signal value for third parties. In particular, it is preferred that at least regularly, rather substantially every time, a time-stamping signal value or intermediate value T#2-T#8 is calculated, it is caused to depend upon at least one previous value T#1-T#7, most preferably the immediately preceding such value T#1-T#7. It is realized that the corresponding can be applied to the calculation of P2-P8.

It is realized that some or most time-stamping signal values T#1-T#3, T#6-T#8 depend upon at least one externally provided reference document A, B, D1-D9 and are calculated as a direct consequence of the selection of a new corresponding reference document. Some signal values T#4-T#5, however, are not created as the direct consequence of the selection of a new corresponding reference document, but of the selection of some internally generated piece of information. In this case, such information may as such be dependent upon externally provided reference documents and preferably comprises at least one previously calculated signal value. The latter type of signal values is preferably used in order to increase the updating frequency of the time-stamping signal. According to one preferred embodiment, over time the number of signal values based upon selection of a new respective externally provided reference document are in minority, preferably there are over time at least 10, preferably 100, signal values based upon an internally generated piece of information for each signal value which is based upon an externally provided reference document.

One way to achieve such time-stamping signal values which do not depend upon any externally provided reference document is to re-iterate tree nodes, such as the current tree root, in the tree structure shown in FIG. 2, back to leaf level, by making the re-iterated tree node an additional leaf node. This may be done at any interval, and may be used to increase the publication rate of documents P1-P6 above the rate of actual additions of new reference documents. Hence, in combination with what was described above regarding addition of new tree leafs T#1-T#6 that do not result in a new publication of a document P1-P6, the publication of new time-stamping signals P1-P6 can be made independent upon the addition of reference documents. For instance, even if the inflow of new reference documents varies, a time-stamping signal which is updated at regular intervals, even very frequently, can be achieved with high reliability and security. It is preferred that the system 100 internal data used to calculate such time-stamping signal values have not been specified to third parties beforehand, since this could make it possible to foresee the future values of the time-stamping signal.

According to one preferred embodiment, also illustrated in FIG. 2, a certain reference document B is time-stamped using the current respective value P6 of the time-stamping signal, and at least a part of a digitally stored version of the certain time-stamped document B, or the output value of a one-way function an input value of which is the certain document B, is used as an input value for the calculation of a subsequent time-stamping signal value T#8.

Such time-stamping of a document B is described in closer detail below, but can for instance include the incorporation of the time-stamping signal value P6 into the document B in the form of an image or a piece of text. Such incorporation of the current value of the time-stamping signal into a reference document which is used to produce the signal will affect the value of the subsequent time-stamping signal T#8 or P8. Hence, by retroactively consulting reference document 8, the then current time-stamping signal value may be read, and at the same time the existence of reference document B is a necessary requirement for the existence of T#8. Hence, such iteration of the time-stamping signal production process involving a reference document B adds an additional layer of security to the method.

It is preferred that each published time-stamping signal value P1-P8 comprises a one-way function output value according to the above, such as a hash value, of at least 256 bits. Furthermore, it is preferred that it comprises a date and time information specifying a time after which the signal value in question was publically known and/or a date and time information specifying a time before which the signal value in question was not publically known. The latter may for instance be the time of creation of a corresponding reference document. For such timing activities, the clock 107 is used for reference.

FIG. 2 also illustrates another aspect of the present invention, namely to use the repeatedly or continuously updated time-stamping signal to create a time-constrained digital signature of a document A, B, D1-D9. In the exemplifying case with document B, this document is provided by the user 131 and not automatically selected by the system 100, for creation of a digital signature of the document B. However, what is said herein in relation to creating a signature of document B is also applicable to document A and to reference documents D1-D9.

According to this aspect, the said signature is created so that it is constituted by, comprises or is calculated based upon the output value of a certain signature one-way function, which in FIG. 2 is exemplified by one-way function $\#_2$ but which may be any one-way function as defined herein. An input value to the signature one-way function is at least a part of a digitally stored version of the document B. In this exemplifying embodiment, the input value is document B in its entirety, even if any well-defined, predetermined part may be used as long as it is practically impossible to calculate the corresponding one-way function output value without knowledge of the contents of document B. The output value is T#8. However, the downstream value P8 may also be selected constitute a signature of document B.

It is preferred that each signature created by or received by the system 100 for a document is stored in database 106 and associated with the document in question, for future use for instance as a proof signature.

Further according to this embodiment, a time-stamping signal value is created according to the above described, the current value of which signal, or a value which has been calculated based upon the current value of which signal, is also used, together with document B, as an input value to said signature one-way function. In this example, the time-stamping signal value is T#7.

In the corresponding example using document A, the input value is the whole or a part of document A in combination with D123#, which in this case constitutes the time-stamping signal value, and the output value may be T#1 or P1.

The created signature, or a value which has been calculated based upon the signature, is then publically published, as P8 in the exemplifying case of document B, over at least one, preferably several parallel, publication channel(s) as described above, making it possible to third parties to later verify the publication time of the signature. This provides a way to be able to prove that document B in its form when selected by system 100 did exist at least at the publication time of P6, and that the signature was not created before the time of selection of documents D7 or D8 by the system 100. Also, if P6 is incorporated into document B as described above before calculating T#8, it can later be proven that document B in its form when selected by system 100, with the incorporated P6, did not exist prior to the creation of P6. The use of this is elaborated on below.

According to a preferred embodiment, respective signatures are calculated for a plurality of documents A, B, D1-D9 at different points in time, and logically stored in a tree structure as described above, wherein a distinct tree one-way function #$_3$ output value of the tree root, or a distinct value which has been calculated based upon this output value, is publically published for each document in said plurality of documents.

In analogy to what has been described above for the production of T#4 and T#5 not as a direct consequence of the selection of a certain external reference document, according to a preferred embodiment the tree one-way function #$_3$ output value of the tree root, or a value which has been calculated based upon this output value, is publically published also without being the consequence of a signature having been created for a document, and that such publication is preceded by the addition to the tree structure of a value which is not the freshly calculated signature of a document. An example of such value is an internally generated piece of information as described above.

It is particularly preferred that such an internally generated piece of information is one of the previously calculated output values of the tree one-way function #$_3$.

It is realized that such re-use of the tree one-way function #$_3$ output values in order to create intermediate public publications of values between the creation of signatures of documents is similar to the re-use of previously used time-stamping signal values as described above and used to provide updated time-stamping signal values based only on internally generated information, and that these two methods may both be used both for the generation of the time-stamping signal as such and for the presently described aspect of creating digital signatures of documents.

Furthermore, it is preferred that the digital version of the document A, B used for the calculation of the said signature one-way function output value is associated with the created and/or published signature and stored, preferably in the database 106, for future reference and use when a third party requires a verification of the created signature.

Some digitally stored documents may comprise too little information for providing sufficient security for the present purposes, since a brute force attack may be successful in guessing the contents of such a document and that way calculate the corresponding one-way function output value. Examples include documents containing 10 bytes or less of significant information. Therefore, and in particular for such small documents, it is preferred that a random number is also used as an input value to the signature one-way function, in addition to the document itself. In this case, it is also preferred that the said random number is associated with the small document and/or the signature one-way function output value and stored in the database 106 for future reference when re-calculating the output value of the one-way function in question. Preferably, such a random number is a random alphanumerical string containing at least 16, preferably at least 256, random bytes.

It is preferred that the system 100 is arranged to continuously produce the above described time-stamping signal, and to provide it to third parties in substantially real-time via the described publications of the signal value via interface 103. It is also preferred that the system 100, via interface 104, accepts digitally stored documents from third parties, such as user 131, for which documents a signature is created and published as described above. It is also preferred that any document which is accepted for signature creation is also used as an input into at least one one-way function the output value of which is used to calculate the said time-stamping signal value. This way, any document provided by a third party automatically becomes part of the time-stamping signal process, so that the document and evolvement of the time-stamping signal over time engage in a mutually dependent manner, making it substantially impossible for third parties to fake signatures produced according to the present invention since this would require the whole historic time-stamping signal process to be reconstructed or faked.

According to a method for time-stamping a document according to the present invention, a time-stamping signal according to the present invention is embedded or incorporated into a document, such as document B in FIG. 2, which has previously been provided to the system 100 by a third party or which after embedding or incorporating is provided to the system 100, such as user 131. The embedding or incorporation is done in such a way so that it is possible to read the value of the embedded or incorporated time-stamping signal from or based upon the document. Then, a signature of the document B with the embedded or incorporated signal value is created, so that the said signature can be re-calculated only with knowledge of the contents of document B with the embedded or incorporated signal. This way, it is possible to, at a later point, prove that document B with the embedded or incorporated signal did not exist prior to the time-stamping time of the embedded or embedded or incorporated time-stamping signal, and that document B at least existed when the signature was created.

Therefore, a time interval during which document B with the embedded or incorporated signal must have been created can be established and publically proved with high certainty. It is particularly preferred that the time-stamping signal is in fact embedded or incorporated into the document in immediate connection to the creation or updating of the document in question. It is especially preferred that such incorporation takes place using a piece of standalone technical document-creating equipment which is arranged to read a time-stamping signal from the system 100 directly via interface 103 or via publications P1-P8, to embed or incorporate the time-stamping signal value as an integrated part of the document-creating process, and to substantially immediately provide the created document to the system 100, via interface 104, for creation of a signature and publishing of the corresponding time-stamping signal. Examples of such methods are given in the following.

As an alternative to embedding or incorporating the current value of the time-stamping signal at the time of time-stamping of the document, the said current value may be associated and stored together with the document on a central server, such as in the database 106, for future reference. Alternatively, the document may be available from an external source, in which case only a one-way function output value from a one-way function to which the document is input value may be stored in database 106.

Figure 4A:
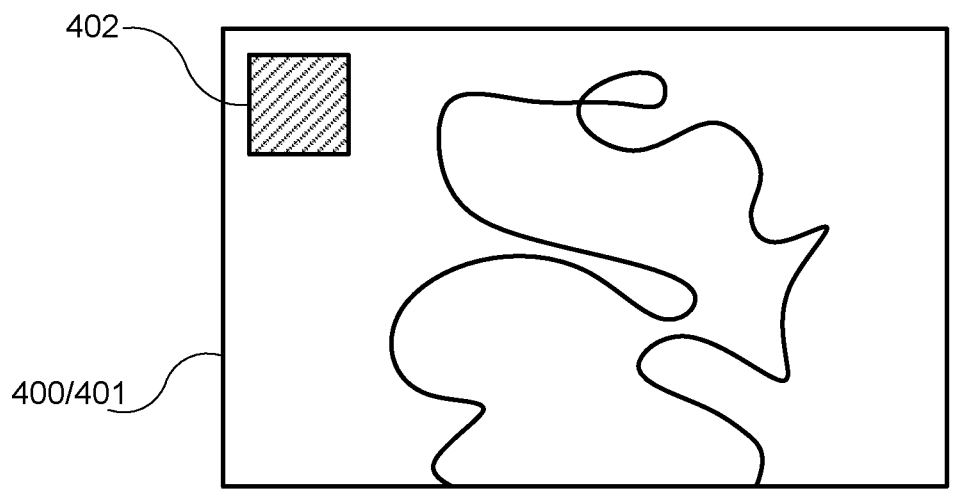
FIGS. 4a-4c are respective schematic representations of different ways of time-stamping a document.
Figure 4B:
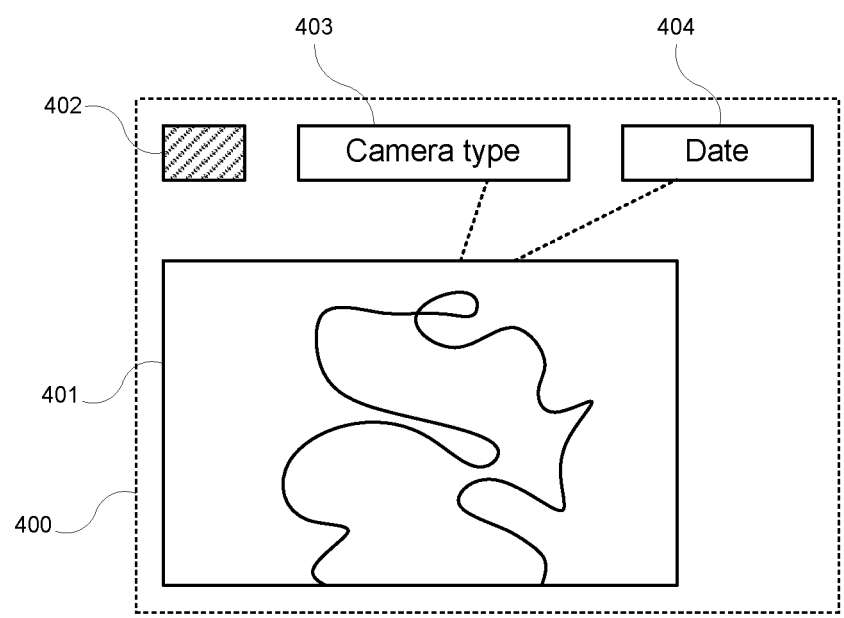
Figure 4C:
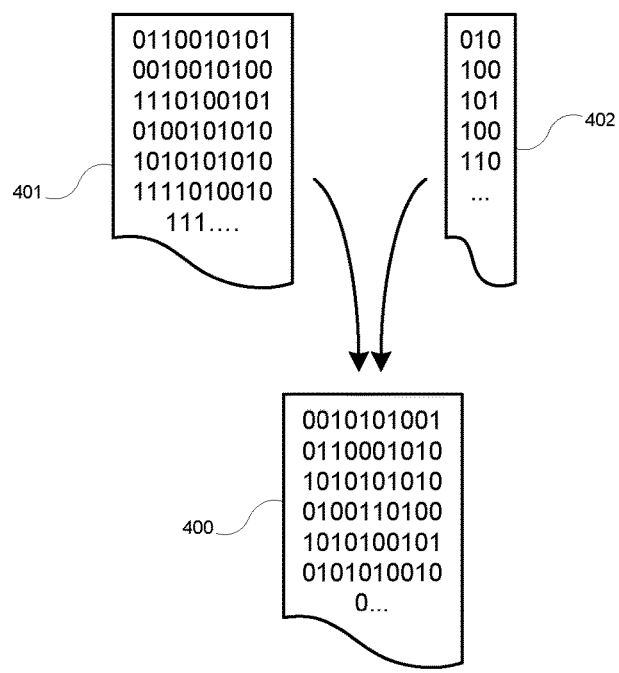

FIGS. 4a, 4b and 4c show three different ways of embedding the time-stamping signal 402 into a digitally stored document 400, where the embedded time-stamping signal is in the form of a piece of information from which the value of the signal can be deduced. The three examples are all applied to a document 400 comprising image data 401, but it is realized that the corresponding time-stamping techniques can be applied to other types of documents, such as documents comprising video footage, plain text, audio, a web page and so on, or combinations thereof.

In FIG. 4a, the time-stamping signal 402 is introduced in the form of a graphical element, such as a string of alphanumeric characters, a QR code or a barcode, into a visual representation of the document, which graphical element carries said piece of information. Hence, by viewing the document 400 image and interpreting the graphical element, the value of the time-stamping signal is readily available.

In FIG. 4b, the document 400 comprises, apart from the image data 401, also conceptually illustrated metadata information 403, 404. Then, said piece of information 402 is added to a digitally stored version of the document as a metadata field. Such metadata field is of course only visible when read by a metadata reading algorithm, which may be conventional as such.

In FIG. 4c, said piece of information 402 is in the form of a digitally coded watermark 402 which is incorporated into a digitally stored version of the document 400. In the exemplifying case shown in FIG. 4c, the image data 401 and the time-stamping signal value 402 are merged using a per se conventional digital watermarking algorithm, so that the resulting document 400 comprises an image which is substantially unaffected when viewed in the normal way, but which reveals the encoded time-stamping signal value 402 when subjected to a predetermined, per se conventional watermark decoding algorithm.

It is preferred to incorporate a current value of a time-stamping signal, for instance a time-stamping signal such as the one described above, automatically upon production of a document. Preferably, this takes place at the same instance as, or in immediate connection to, the production of the document. In the case of a document which is only available in a digital form once produced, such as a digitally stored image obtained by sampling light inciding towards a digital image sensor, it is preferred that the said incorporation takes place as a part of the sampling process, or at least as an integrated step of the image production process before a final digitally stored image is obtained and can be used.

Figure 5A:
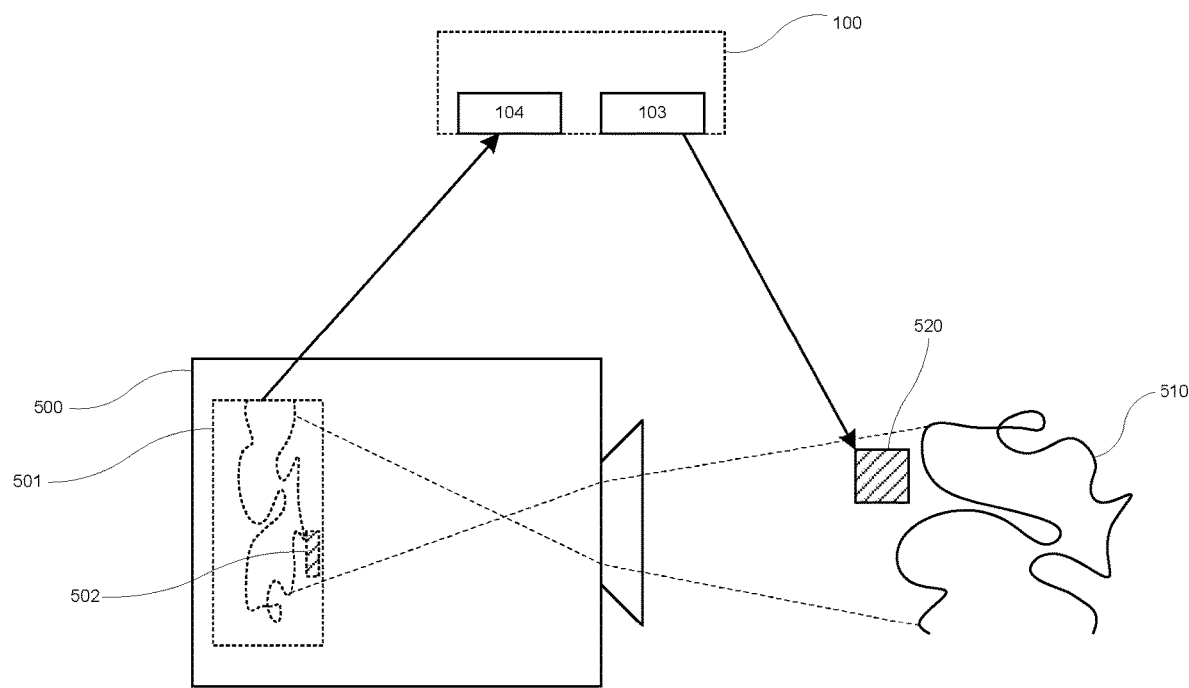
FIGS. 5a-5d are respective schematic representations of different ways of automatically incorporating a current value of a time-stamp into a document.
Figure 5B:
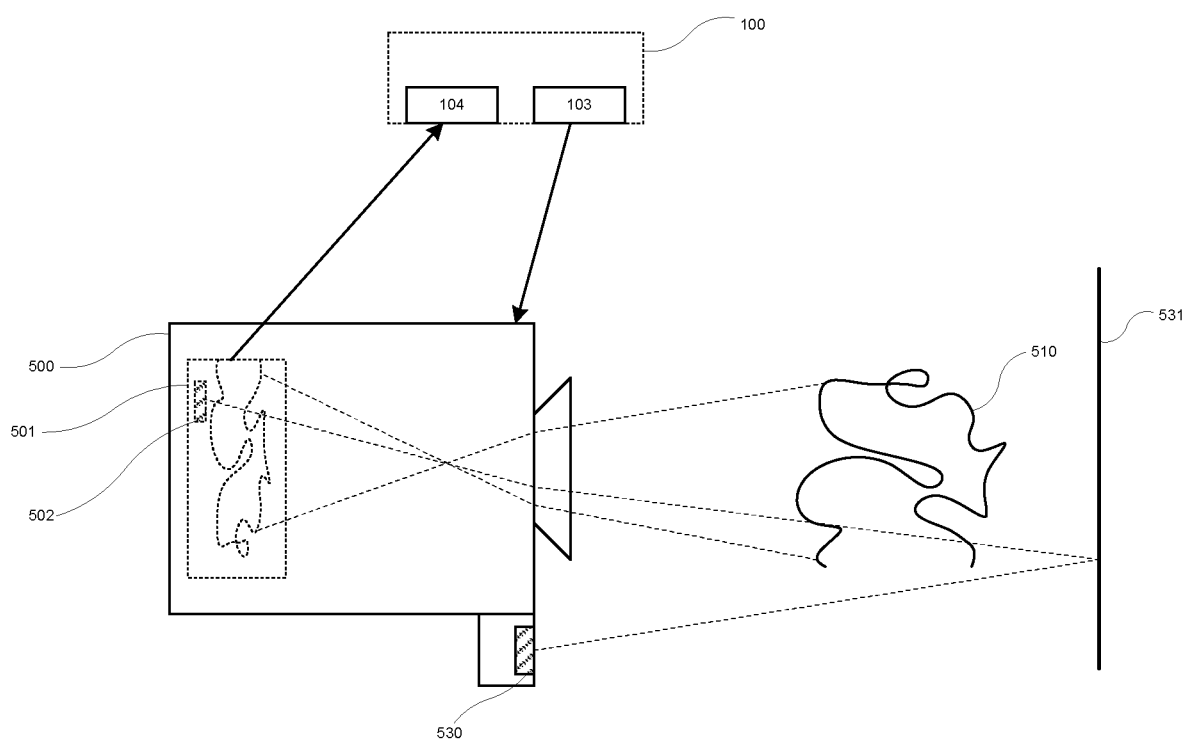
Figure 5C:
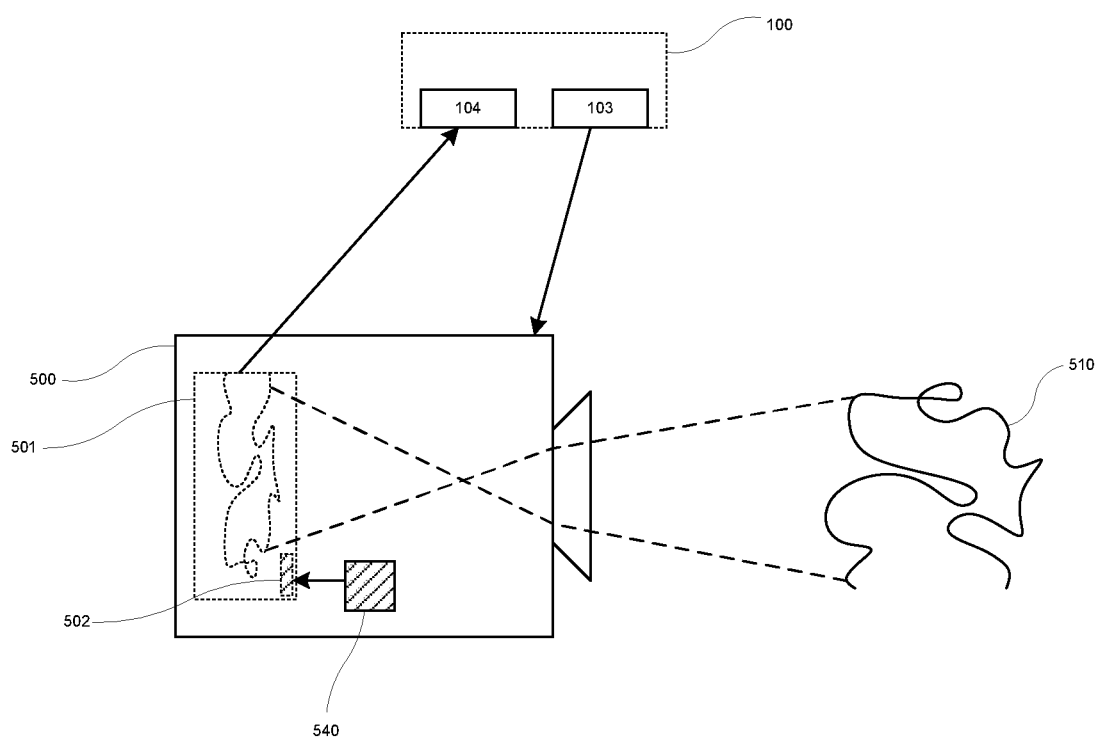

FIGS. 5a, 5b and 5c illustrate the use of a piece of document producing hardware sampling equipment 500, arranged to sample a real world physical phenomenon, such as taking a digital photography, and to produce a digitally stored sampled document 501 reflecting a corresponding state of the real world. The equipment 500 is specifically adapted to perform a time-stamping method according to the present invention.

In FIGS. 5a-5c, the document 501 produced is exemplified by an image, and the piece of equipment 500 is an optical camera. It is, however, realized that other types of documents can also be contemplated in corresponding ways, as elaborated on above in connection to FIGS. 4a-4c. Hence, the camera 500 may instead be for example a digital audio recorder or a digital video camera.

A real-world item 510 is depicted by the camera 500 in the form of the digitally stored, conceptually illustrated document 501, and it is preferred that the document 501 is substantially immediately transferred, by the camera 500, to a system 100 according to the present invention, via interface 104 to which the camera 500 is connected via a communication channel to which the camera 500 has been provided access, for instance via wired or wireless Internet.

Then, the system 100 preferably uses the document 501 as input variable into a one-way function so that later produced time-stamping signal values depend upon the existence of the document 501. Specifically, it is preferred that a digital signature of the time-stamped document 501 is created according to the above described, and that the produced signature is associated with the document 501 and stored in the database 106.

According to one preferred embodiment, the equipment 500 is caused to calculate a one-way function output value of the document 501, in connection to performing the sampling, which sampled physical phenomenon constitutes the document 501, and said output value is then communicated from the equipment 500 to the central system 100 over said communication channel.

It is also possible, in other embodiments, for the equipment 500 to calculate the signature of the document 501 itself. In this case, the equipment 500 first receives the current value of the time-stamping signal from interface 103, via a communication channel provided between the system 100 and the equipment 500, such as a communication channel via wired or wireless Internet.

In particular when the document 501 comprises at least one still image, or one frame in a moving image, it is preferred that the current signal value at the time of sampling the document 501 is embedded 502 into the image or frame by positioning a graphics-presenting device 520, arranged to show a graphical element carrying said piece of information such as an alphanumerical code, a barcode or a QR code, in the image or frame as viewed by camera 500, so that the graphical element is captured as a part of the sampled document. This is illustrated in FIG. 5a, in which the graphics-presenting device 520 has been provided access to said communications channel to interface 103 of system 100, over which the current time-stamping signal value is communicated to the device 520 for display. The device 520 may, for instance, be in the form of a small screen.

FIGS. 5b and 5c, on the other hand, both illustrate situations in which the camera 500 itself is provided access to a communication channel over which the current value of the time-stamping signal is communicated to the camera 500 from interface 103, and wherein the camera 500 itself embeds the current signal value into the document 501 in connection to performing the sampling.

In FIG. 5b, there is a graphics-presenting device 530 which is an integrated part of the same general device as the image-capturing device 500. For instance, the device 530 may be in the form of a small screen located on the front side of the camera 500, such as the screen on a so-called smartphone the front camera of which is used to capture the document 501 image. The graphics-presenting device 530 is arranged to present said graphical element at the same time as the camera 500 captures the document 501 image. A mirror 531 is used, so that the device 530 is visible in the view of the captured document 501 image. Hence, the document 501 depicts, via mirror 531, an image covering the device 530.

Both the method illustrated in FIGS. 5b and 5c are particularly suitable when the document 501 comprises at least one still image, or one frame in a moving image. In the latter case, it is preferred that the subsequent frames in the moving image are treated as described herein for one frame, iteratively.

In FIG. 5c, the current signal value at the time of capturing the image or frame is embedded into the document 501 image by feeding the signal to the camera 500, from interface 103, and causing the camera 500 to embed the said piece of information digitally into the document 501 image. This is achieved by a digital image-manipulation means 540, which may be software-implemented but for security reasons preferably is in the form of a dedicated piece of hardware equipment which is integrated into the camera 500 and arranged to receive and automatically embed the piece of information into the document 501 upon sampling.

It is realized that the embedding techniques illustrated in FIGS. 4a-4c can be used together with embedding techniques illustrated in FIGS. 5a-5c in any combination, both for image documents and any other type of applicable document.

By incorporating the current value of the time-stamping signal into the document 501, the document can be securely time-stamped in a way which can be verified by third parties in retrospect. If the document 501 is also substantially immediately fed to the system 100 so that it is used for the calculation of future time-stamping signal values, the captured document 501 can be securely time-stamped within a very short time interval within which the document must have been produced.

Figure 5D:
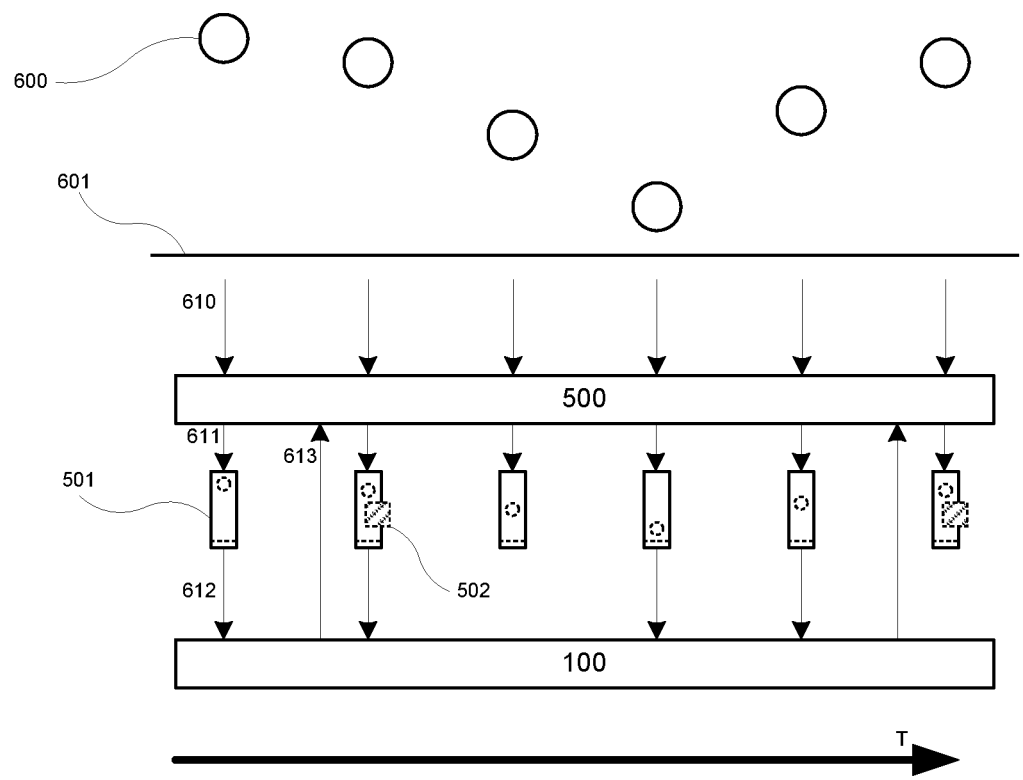

FIG. 5d illustrates schematically a timeline T and associated events between a real-world event involving a ball 600 bouncing on the ground 601, which is depicted using camera or video camera 500 which is in turn connected to a system 100 according to the present invention.

The camera 500 is arranged to sample 610 the light incident from the scene with the ball 600 towards the camera 500, and to produce 611 a series of digitally stored images 501, each depicting the bouncing ball 600 at different points in time. This series of images 501 may preferably be in the form of a video footage, such that each image 501 constitutes a respective frame in a video film of the bouncing ball 600.

Preferably, the current respective value of the time-stamping signal is received 613 from the system 100, via interface 103 and is embedded 502, as described above, into the sequence of images 501 by individual images being caused to contain the respective current value of the signal at the time of capturing the image in question, or at least the last known updated such value at the time of capturing the image 501.

As illustrated in FIG. 5d, all images 501 need not have an embedded signal value 502. However, in order to improve security, it is preferred that at least one frame every second of a captured video stream includes such a value 502, and preferably at least 10% of the individual images 501 in a sequence of images captured by the camera 500 in accordance with what is described herein.

This makes the image sequence difficult to fake for a third party, since the progression of the time-stamping signal can be traced afterwards in the sequence of images 501.

In order to further improve security, it is preferred that at least one image 501, preferably at least one image every second of a captured video stream, and preferably at least 10% of the individual images 501 in a sequence of images captured by the camera 500 in accordance with what is described herein, is or are communicated to the system 100, via interface 104, so that the image can be used as a reference document for producing the time-stamping signal as described above. This way, the updated time-stamping signal embedded in at least one later captured image will contain an embedded time-stamping signal which is dependent upon a previously captured image in the same series of images or the same video stream. Preferably, at least one such previously captured image had the then current value of the time-stamping signal embedded in such a way so that it affects the value of the time-stamping signal calculated based upon that image. This makes the sequence of images or video stream an integrated part of the evolvement of the time-stamping signal, which in turn makes it possible to at a later point in time verify the time of capturing the sequence or stream with very high certainty, by referring to publically public information as described above.

Instead of using for instance a single frame of a video footage, it is preferred to as reference document use a long enough section of a stream, such as a video and/or audio stream, in order for a human taking part of the said section at a later point to obtain a good understanding of the contents of the stream at that point. For instance, the selected section should be at least 10 seconds, preferably at least 1 minute, preferably at least 2 minutes long. The time stamp associated with the reference document would in this case be the actual end time of the section, and this time information should be associated with the reference document and stored in database 106. It is preferred that data from substantially the whole time frame of the selected section is used as input value to the corresponding one-way function.

Furthermore, reference documents from the same stream reference source will in this case preferably be produced at more frequent intervals than the length of each section. Then, it is preferred that the stream itself, that is the reference source data or a converted or sampled form of the same, is stored in its entirety in database 106, together with information regarding how to extract which reference documents from the stored stream. This way, there is no obligation to store each selected section for each reference document also in cases where such sections overlap.

To further add additional security, it is preferred that a number of consecutive images 501 comprise footage of a natural phenomenon the development of which is foreseeable by a viewer. This is illustrated in FIG. 5d in the form of the bouncing ball 600, and makes it more difficult to fake the series of images by for instance image manipulation.

Such a deterministic phenomenon is useful, but it is even more preferred to, instead of the bouncing ball 600 described herein, use in the corresponding manner a phenomenon the general development of which is foreseeable and clearly time-directed, but the details of which comprise chaotic elements. Examples include a fire developing and a road with traffic passing by.

Such a method is particularly suitable for use in a video conference system or a video surveillance system which is arranged to capture video footage in accordance to what has been described in connection to FIG. 5d, possibly in combination with what has been described in connection to FIGS. 5a-5c.

For instance, a video conference or surveillance system may comprise an image-displaying device 520, positioned in the view of a video camera and arranged to display a current and preferably continuously updated value of the time-stamping signal to be captured as a part of the captured video footage, while the video footage data is continuously fed to the system 100, creating a feedback loop in turn making it easy to later verify the time of recording of the video stream. In another example, a natural phenomenon, such as a moving pendulum, is arranged in the view of the video camera.

In other words, in these embodiments the sampling equipment 500 is caused to sample 611 the physical phenomenon repeatedly over some period of time T so that several reference documents 501 are produced, at least one such document is time-stamped as described above, at least a part of a digitally stored version of the said time-stamped document is used, by the system 100, as an input value for calculating the time-stamping signal as described above, and the time-stamping signal value after being updated using the said time-stamped reference document is embedded into a later produced reference document as captured by the equipment 500.

Figure 6:
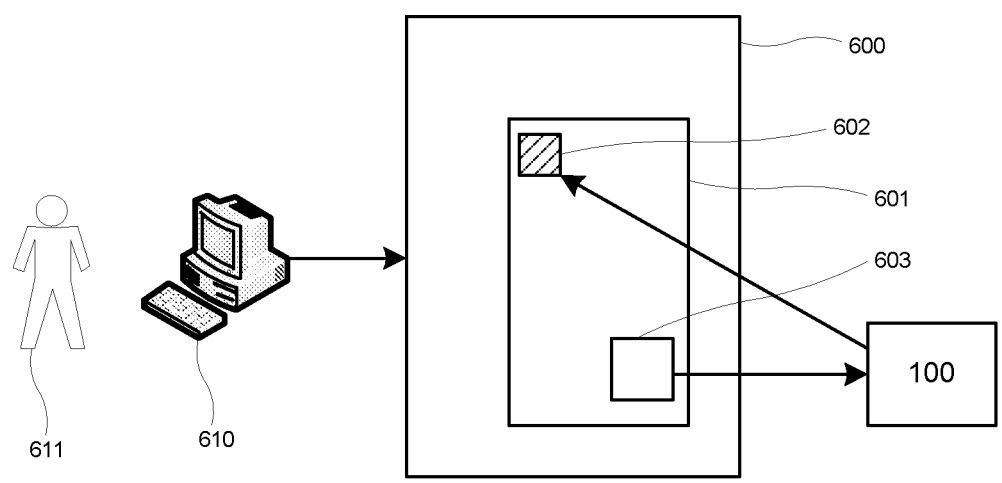
FIG. 6 is a schematic representation of a dynamically updated web page according to the present invention.

FIG. 6 illustrates a web server 600 arranged to provide a web page 601 to a requesting computer device 610, upon the command of a user 611. The web page 601 is merely schematically illustrated in FIG. 6, for reasons of clarity.

The web page 601 comprises an embedded time-stamping signal value 602, which can be embedded in any of the ways described above in connection to FIGS. 4a-4c, but is preferably a component on the web page 601 which is visible to the user 611 viewing the web page on the screen of the computer device 610.

Hence, the web page 601 constitutes the digitally stored document referred to above.

The web page 601 further comprises programming code 603, schematically illustrated in FIG. 6, which code 603 is arranged to initiate a time-stamping of the document, i.e. the web page 601, according to what has been described above. Hence, the programming code 603 is arranged to receive from the server 100, via a communication channel such as the Internet and via interface 103, an updated time-stamping signal value from the server 100, and to update the embedded value 602 in accordance with this updated signal received from the server 100. Preferably, this reception of the updated time-stamping signal value is preceded by the programming code 603 communicating a current state, such as the current visual look, of the web page 601 to the server 100, via a corresponding communication channel and via interface 104, so that the updated signal value is based upon said communicated state.

It is preferred that such an update procedure of the embedded code 602 is initiated by the programming code 603 as a consequence of the web page 601 being requested by computer device 610, and hence being viewed. This way, it is guaranteed that the user always sees an embedded code 602 which was the most recent one available at the time of the requesting of the web page 601. Also, it can later be proven how often and when a web page has been requested, by consulting system 100 via interface 105.

The programming code may be of a conventional type, such as Javascript (registered trademark).

FIG. 7a illustrates the setup, and FIG. 7b the method steps, of a method according to the present invention of providing a way to verify the integrity of a document 701, which document may but need not be digitally stored, and may for instance be a document which is printed in a magazine or an outdoor commercial spot, or displayed on an electronic display. It is preferred that the document 701 is printed in a permanent way, integrated within the document.

In this method, the document is firstly time-stamped according to what has been described above, in the sense that the system 100 calculates an updated time-stamping signal value and associates a digitally stored version of the document 701, such as a digital sampling of the document or an original, digitally stored master copy of the document 701, in the database 106 with the said updated signal value.

In a next step, the document is published with a visibly embedded piece of information 702, such as described above in connection to FIG. 4a. This publishing is done by a publishing device 700, which may for instance be a print shop or -office, arranged to receive the above said updated time-stamping signal and to embed it into the image 701 as information 702. It is preferred that the information 702 is published as an integrated and inseparable part of the document 701. It is further preferred that the information 702 is embedded in the form of a QR code or barcode, since such are easily recognized by image interpretation software in the system 100.

Then, a communication channel is provided, over which a third party user 710 can send, via interface 105 to the system 100, a depiction of the published document 701. The user 710 can typically use his normal Internet-connected camera 711 or smartphone to take a picture of the image 701, including the information 702, and send the digitally stored picture, via interface 105, to the system 100 for analysis.

The system 100, in turn, accepts the depiction of the published document, and deduces the value of the time-stamping signal from the piece of information 702 visible in the depiction. This is made in a way which is convention as such, and may comprise image interpretation logic, and specifically interpreting a QR code as an alphanumerical code which is or is associated with the signal value in question.

Then, based upon the said time-stamping signal value represented by information 702 and its association with the digitally stored version of the document 701 in the database 106, the system 100 finds said digitally stored version, if there is such a digitally stored version associated with the said time-stamping signal value in the database 106.

If such a document is found, the digitally stored version of the document itself, or information pertinent to that document, is communicated to the third party 710, via interface 105 from the system 100, and for instance to an internet-connected computer equipment 712 of the user 710. Pertinent information may, for instance be predetermined additional information, such as metadata, which has been associated with the document in the database 106 beforehand.

It is preferred that such metadata is a piece of information using which the user 710 can identify the image, and that way verify the authenticity of the image 701. For instance, the document itself may be sent, in which case it is easy for the user 710 to verify the image by simply comparing the image 701 to the document received to the computer equipment 712.

Such a method provides a way for the user 710 to, using only standard equipment such as a normal smartphone, quickly and reliably verify the authenticity of an image irrespective of where or in what format it is presented.

In a preferred embodiment, the image-capturing equipment 711 continuously analyzes imagery captured by equipment 711 and monitors for visual pieces of information 702 in the view of equipment 711. As soon as such information 702 has been detected by the equipment 711, the information is sent to system 100 for verification, as described above, and if the time-stamping signal value represented by the detected information 702 is found to correspond to a document previously time-stamped by the system 100, information relating to the time-stamped document is received by the equipment 711 from system 100, whereupon the equipment 711 displays an image with graphical overlay in connection to the detected information 702, giving information to the user 710 that the detected information 702 is associated with a time-stamped document. For instance, a smaller version of the image itself can be displayed on top of, or in connection to, the information 702 when visible in the view of the equipment 711.

FIG. 8a illustrates the setup, and FIG. 8b the method steps, of a method according to the present invention of providing a way to verify the integrity of a digitally stored document 801 which is published on the Internet and viewed using a web browser 802, for instance as a part of a web page 803.

Such a method comprises the step of, firstly, time-stamping the document 801 according to what has been described above and in analogy with the initial time-stamping of document 801 as described above in connection to FIG. 7a. The document 801 may be, for instance, an image, a video sequence, or other types of graphical material the authenticity of which may be desired to verify by a third party 810 user viewing the web page 803.

In a next step, the document 801 is published on the Internet, with associated programming code arranged to react upon some kind of activation by the user 810. The programming code is preferably a part of the web page 802, and may be integrated into the document 801 itself. Such activation may, for example, be in the form of activation of an activation means, such as a selection of or clicking on the document 810 in the web browser 803, or the activation of a user control 804 such as a graphically represented clickable field, for instance in the same web page 802 as the document 801.

Upon a detection of such activation, the document 801 is sent to the system 100, via interface 105. Upon receipt of the document 801 in the system 100, the system 100 is caused to lookup, in the database 106, if the document 100 has been time-stamped by calculating the corresponding digital signature and checking if a document with the same digital signature has previously been time-stamped. This check is preferably based upon previously calculated hash values rather than upon the previously stored underlying documents themselves. Alternatively, a one-way function output value is calculated, with the document 801 as an input value, and the said output value is communicated to the system 100, via interface 105. Then, the system 100 checks if a document with the same signature as the provided value has been time-stamped. In this latter case, the system 100 may not need to store the document 801 itself, but only the digitally stored signature of the document 801.

If such a document is found, the system 100 is arranged to communicate, to the third party user 810, some kind of information 805 pertinent to the document 801 and which allows the user 810 to verify that the document 801 is authentic in the meaning that it is verifiable that the document 801 has previously been time-stamped by system 100.

It is preferred that the said pertinent information is presented in the web browser 803, possibly in the same web page 802, in that case preferably as an embedded part of the document 801. In some embodiments, the pertinent information 805 is a symbol, such as a check-mark or such, simply signaling that a match was found in the database 106. In other embodiments, the pertinent information 805 is in the form of a graphical element similar to the element 402 as described above in connection to FIG. 4a, allowing the user to identify, directly or indirectly, a time-stamping signal value associated with the document 801, which then can be used to directly verify the time-stamping authenticity of the document 801 via interface 105. It is also preferred that the pertinent information comprises a time and date of the time-stamping of the document 801 by the system 100.

It is preferred that the interface 103 is arranged to provide the said pertinent information in the form of the document 801 itself, with the said pertinent information visually embedded in the document 801, and that the web browser 803 is arranged to replace the document 801 with the one provided via interface 103 upon said user 810 activation and database 106 lookup.

Moreover, in the particular case in which the document 801 is a still or moving image, it is preferred that, upon a first user 810 activation, the said pertinent information is published in connection to the image, such as communicating an updated document 801 with embedded pertinent information 805 as described above, but without the web browser 803 leaving the currently viewed web page 802.

Upon a second user 810 activation, it is in this example however preferred that the web browser 803 is redirected, preferably on the initiative of said programming code in the web page 802, to another page, where the document 801 together with pertinent information 805 is presented to the user 810 in the web browser 803. In this case, it is preferred that the web page redirected to is a trusted web page hosted by the operator of the system 100, where more detailed information about the document 801 and its time-stamping can be presented to the user 810.

In all the above described examples relating to FIGS. 8a and 8b, it is preferred that the said pertinent information 805 comprises the time of the document 801 time-stamp as stored in the database 106.

According to another, related, embodiment, a document which has not yet been time-stamped by system 100 is provided with a piece of programming code providing an activation means allowing a viewing user to activate a function which results in the sending of the document in question, via interface 104, to the system 100 for time-stamping. Preferably, metadata specific to the web page in which the document in question is shown, preferably also along with metadata specific to the activating user, is also sent to the system 100 for time-stamping in association with the document. According to one preferred embodiment, the programming code thereafter changes the activation means to the type discussed above, allowing a user viewing the webpage to verify the time-stamping of the document.

According to one preferred embodiment, a webpage is provided in which all documents contained in the webpage and that have already been time-stamped are provided with respective activation means allowing the user to verify a previously made time-stamp, while the remaining documents contained in the webpage that can be time-stamped by the system 100 are provided with respective activation means allowing the user to perform a time-stamping of the document in question.

FIG. 8c illustrates an embodiment of the present invention, in which the user 810 uses a computer device 811 to view a certain webpage provided by a server 820. 821 is a simplified illustration of how the webpage looks when viewed in a browser on the computer 811 as directly communicated from server 820 to computer 811, for instance via the Internet.

However, the user 810 can choose to view the webpage provided by server 820 through a filtering server 830, in which case the viewed webpage looks like the simplified illustration 831. In 831, the webpage is shown in a way corresponding to the way in 821, but with added or modified content. In 831, this content is exemplified by check-marks on documents that have been confirmed to have been time-stamped previously by system 100.

In order to produce the webpage view 831, the filtering server 830 fetches, upon the request of the user 810, the webpage in question from server 820, and investigates its contents. Preferably, both the webpage as a whole and its various constituent parts are examined individually, and each are sent to the system 100 for verification of any time-stamps made for the respective sent items. The procedure for performing such verification has been explained above. Then, each positive verification is stored by server 830, which then adds elements to or modifies documents verified to have been previously time-stamped by system 100 and sends the modified webpage to the user's 810 computer 811 for viewing as 831. In FIG. 8c, all three documents contained in the webpage, as well as the webpage itself, were verified to have been time-stamped.

It is preferred that the said added or modified content constitute respective activation means as described above, by the activating of which the user 810 may verify that the time-stamp is indeed authentic as described above.

Hence, the filtering server 830 is arranged to read webpage data from web server 820, to investigate if the received webpage data contains any documents of a type that may be time-stamped by system 100, to send a query to the system 100 requesting verification, for each one of the found documents, if any, of whether the respective documents have been previously time-stamped by the system 100, and then to produce updated webpage data with incorporated verification signaling elements for documents that have been verified to have been time-stamped, to the computer 811 operated by user 810. It is preferred that the signaling means are in the form of visual elements shown in connection to each verified document in the modified webpage.

It is furthermore preferred that the filtering server 830 is arranged to, as a consequence of the user 810 requesting the webpage data via filtering server 830, send to the system 100, via interface 104, each document contained in the webpage, and preferably also the webpage itself if applicable, that can be time-stamped by the system 100 and which has not yet been time-stamped by the system 100, for time-stamping such as been described above. Alternatively, one-way function output values of such documents may be sent to the system 100, using a predetermined one-way function which is known by the system 100.

Applying the above described techniques, and in particular the creation of a digital signature of a digitally stored version of a document, it is possible to achieve a way to be able to verify the integrity of a digitally stored document, in the sense that it is possible to establish that the document in question is identical to a document for which a digital signature was created at a historic point in time, which point in time can be specified with high certainty as described above.

In such a method according to the present invention, which is illustrated in FIG. 9a, a digital proof signature is first created of the digitally stored original document, the integrity of a digital copy of which is later to be challenged. The creation of the digital signature is performed as described above, and the signature is associated with the document and stored in database 106. Then, at a later second point in time, the integrity of a digitally stored document, alleged to be an identical, untampered version of the same document as the one for which the proof signature was calculated, is challenged. Then, the system 100 receives, by a challenging third party person or system and via interface 105, a digitally stored copy of the challenged document, for which a corresponding digital verification signature is created of the received document. This verification signature is calculated in the same way as the proof signature, and using the same historic value of the time-stamping signal which was used for the creation of the digital proof signature. Hence, stored historic data regarding the time-stamping signal are sought out in the database 106 and used in the creation of the verification signature. Finally, the integrity of the received document is positively verified only in case the digital proof signature is equal to the digital verification signature. If such verification is possible, it will also be possible to, in a provable manner as described above, specify a point in time at which the original document existed in the same form as the challenged document.

Using the present method, it is also possible to verify the integrity of and time of time-stamping of one or several pieces of digitally stored metadata pertinent to a certain digitally stored document. For instance, an image of the scene of an accident to be used for insurance purposes may comprise metadata regarding photo time and date; geographic position; a text description; information about parties involved in the accident; and reference numbers of related insurance policies. Each of these pieces of metadata may be challenged at a later point in time, and need to be verified.

In general, a method according to the present invention for verifying the integrity of a certain metadata information pertinent to a digitally stored document is similar to the method described above in connection to FIG. 9a, and involves the steps of, at a first point in time, creating a digital proof signature of the document as described above in relation to FIG. 9a, but wherein the signature one-way function is calculated based upon both at least a part of a digitally stored version of the document itself as well as upon said metadata information. The created digital proof signature is stored in database 106. Then, at a later second point in time, the integrity of the metadata in question is verified by receiving the metadata information from a challenging user person or system, creating a corresponding digital verification signature of the document as described above in connection to FIG. 9a and using the same value of the signal used for the creation of the digital proof signature. Lastly, the integrity of the metadata information is verified only in case the digital proof signature is equal to the digital verification signature pertinent to the document.

FIG. 9b illustrates a special case of this general method for verifying the integrity of a piece of metadata, which offers the added advantage that the integrity of one or several pieces of metadata information can be verified without any need to provide information from or to a challenging party or to third parties about other metadata, that may be sensitive. For instance, in the insurance example above the photo time may have to be verified without having to exchange information regarding the geographic position about the accident.

Hence, in this case there are several pieces of metadata #1, #2 and #3 pertinent to the digitally stored document for each of which, at a first point in time, a separate digitally stored metadata signature is created as described above, for instance in relation to FIG. 2. To this end, the piece of metadata is treated as a document, and the metadata signature is then calculated in the same way as a signature would be calculated for a document, and stored in database 106. For pieces of metadata comprising only limited amounts of information, it is preferred that a random number is also used as input value to the respective signature function for calculating the respective metadata signature, as described above.

Thereafter, the digitally stored proof signature is created for the original document so that the used signature one-way function is calculated based upon also each digital metadata signature. It is preferred that the respective metadata signatures and the proof signature are arranged in the form of a tree structure, such as a hash tree similar to the one described above in relation to FIG. 2, in which the proof signature is located in the tree root and such that each leaf constitutes a respective metadata signature. The proof signature for the original document is stored in database 106.

At a later, second point in time, challenging third party user or system provides a subset of the several pieces of metadata, such as metadata #1 and #2 but not #3, which is received by system 100 via interface 105. The challenger may also provide a digitally stored copy of the original document, in case the document itself is also to be challenged. Then, corresponding digital verification signatures are created first of the received pieces of metadata and then of the original document, or the provided digital copy, in the same way as the proof signature for the original document was created and using the same value of the signal used for the creation of the digital metadata signatures and the digital proof signature. However, the stored digital metadata signatures are used only for pieces of metadata not received at the second point in time. Provided pieces of metadata replace corresponding stored metadata information.

Finally, the integrity of the provided subset of the pieces of metadata is verified, via interface 105, only in case the digital proof signature is equal to the digital verification signature pertinent to the document.

FIG. 10 illustrates a method of providing a way to verify that a certain document 1001 is remotely published in realtime or near realtime for a user 1010 to view. In the figure, the document 1001 is published as a part of a web page 1002 in a web browser 1003, but it is realized that the document 1001 may be published in other ways, such as on a TV screen or the like. Such a document 1001 comprises information the nature of which is updated to reflect the development of a real course of events which is sampled and continuously published in form of the document 1001.

In such a method, the document 1001 is continuously time-stamped as described above, by being sent to the system 100, via interface 104, and by the system 100 continuously creating and publishing, via interface 103, an updated signature for the currently received document 1001. Preferably, the signature is used as an input variable to a one-way function used for calculating an updated value of the time-stamping signal according to the invention.

By "continuously" in this context is meant that a new signature is calculated either periodically using a short period such as at least once every minute or at least once every ten seconds and/or as soon as the contents of the document 1001 changes and/or as soon as the time-stamping signal is updated by the system 100.

Then, the third party user 1010 is provided access to a means for comparing a continuously updated piece of information 1005 which is embedded into the document 1001 with a corresponding current time-stamping signal value stored in the central server 100.

Such comparison can be performed directly or indirectly. For instance, a currently updated time-stamping signal, calculated based upon at least the updated signature of the document 1001, or the signature itself, can be embedded as a graphical item 1005 into the document 1001 itself, as described above in connection to FIG. 4a, and a corresponding value can be sent, via an independent communication channel, to the same or a different screen which can be viewed by the user, so that the two items can be compared directly and visually by the user 1010. Alternatively, the web page 1002 can incorporate a piece of programming code which is associated with the document and arranged to receive both the said signals and to automatically perform a comparison between them and signal the outcome of the comparison to the user 1010.

For instance, in case the signals match, the programming code can be arranged to publish a marker, such as a check mark 1006, for visual verification by the user 1010. Furthermore, the said programming code can be arranged to extract the value of the item 1005 and to request, via interface 105, the system to verify that the extracted value is indeed a correct and recently updated value, and in case the reply via interface 105 from the system 100 is affirmative, to display the check mark 1006. It is preferred that "recently updated" means that the system 100 can guarantee a time discrepancy of at the most 10 seconds.

There may also be provided a specific way for the user 1010 to explicitly verify that the document 1001 is indeed a realtime or near realtime representation of the said course of events, by for instance initiating one of the described verification processes by activating control, such as pressing a button 1004 in the web page 1002.

Specifically, the programming code can be arranged to, upon a first activation of a control 1004 or a clicking on the document 1001, perform a verification as described above, and to display a visual result signal 1006, and, upon a second such activation or clicking, redirect the web browser 1003 to another web page, preferably hosted by the operator of the system 100 and preferably presenting more detailed information to the user 1010 regarding, for instance, the current state of the document 1001 and/or a proof regarding the time of time-stamping of a recent state of the document 1001.

FIG. 11 shows a system configured for carrying out a method for verifying the integrity of data in a database 1100. The database 1100 can be any type of database comprising any type of digitally stored data, comprising a continuously updated datastream or the like. In such a method, at least one digital proof signature is created of all or a subset of said data, in a way similar to the ones described above, by communicating the said data to the system 100, via interface 104, and by the system 100 upon reception of such data calculating a signature based upon an updated time-stamping signal value, and preferably allowing the created signature to be input data into a one-way function the result of which is or is used to calculate a later time-stamping signal value. The created signature is stored in database 106.

Then, the integrity of the said data in the database 1100 is repeatedly, such as periodically, every day or more frequently, or as soon as the data in the database 1100 is accessed, checked by comparing the said stored digital proof signature with a corresponding but later created digital verification signature which is based upon the current value of the data to be verified and the same time-stamping signal value used for creation of the digital proof signature. In case any discrepancy between the digital verification signature and the digital proof signature is found, a report is sent.

It is preferred that a standalone module 1110, such as a software product run on the same computer as the database 1100 or another computer, is put into communication with the database 1100 and the system 100, via interfaces 104 and 105. Then, the module 1110 reads the data from the database 1100, sends the data to be signed to interface 104, and requests a verification of the previously created signature via interface 105. All these steps are described in closer detail above. Moreover, the module sends the report to a computer 1120 which is operated by user 1121 in case a discrepancy is found, indicating that data has been altered.

In a preferred embodiment, the value of the stored digital proof signature is updated repeatedly, by creating a new digital proof signature according above. Preferably, the updating of the value of the stored digital proof signature is triggered by access events to the database 1100, such that a new digital signature is created as a consequence of each database modification, such as insertions, updates or deletions, by any party. This can be implemented in practice using so called SQL (Structured Query Language) query triggers or the like. Preferably, a new comparison is made before each updating of the signal.

Such a method achieves a fast, low-profile method of continuously monitoring a database and alerting if some data, such as data which is supposed to be immutable, is altered by way of accident or abuse, and where the existence and timing of such modifications can be proven and tracked exactly and with high reliability and trustworthiness.

Above, a number of embodiments have been described. It is however realized that many modifications can be made to the described embodiments without departing from the basic idea of the invention.

For instance, the time-stamping signal can be used in other applications, such as simply being published in a continuously updated manner on a web page for general reference purposes.

A common purpose with all forms of time-stamping described herein is to retrospectively be able to determine what document or information was or was not available at a certain historic point in time. Therefore, time-stamping mentioned herein primarily relate to the creation time of documents, in contrast to their date of destruction.

In order to more fully understand the possible combinations of the different aspects of the present invention as described above, one may introduce the following additional definitions:

A positive time-stamp is a time-stamp that can be used to prove that a document existed at a certain specified time, in other words that the document had already been created at the specified point in time. If a document signature is created according to a present invention, and the signature is associated with the document and publically published according to the present invention, the time-stamping constitutes a positive time-stamp.

A negative time-stamp is a time-stamp that can be used to prove that a document could not have existed, thus been created, before a certain specified point in time. If a one-way function output value, into which a reference document is fed as an input value, is introduced into a document, and a signature for the resulting document with the said one-way function output value is created and associated with the document, this constitutes a negative time-stamp of the document. Then, the document with the time-stamping signal could not have existed before the creation of the time-stamping signal value in question. This has been described above in relation to FIG. 2.

A framed time-stamp is a combination of a positive and a negative time-stamp of the same document, whereby a time frame is set up that determines a first possible time when a document could have been created, using a negative time-stamp, and a last possible time when the document surely was created, using a positive time-stamp. One example is if the mentioned created signature of the negatively time-stamped document is publically published according to the present invention.

An absolute time-stamp is a framed time-stamp where both a positive and a subsequent negative time-stamp relate to the same reference source. In other words, the created signature is fed back to become a part of the same reference source as was used to create the signature. As the timeframe for manipulation decreases toward seconds or less, it becomes very difficult to spoof the time-stamps.

An integrated time-stamp can be applied to documents that have an inherent time dimension, in other words extend across a certain time period, such as video or audio that is captured between a start and an end time. An integrated time-stamp is applied at the very time of document creation, and comprises a repeatedly applied framed or absolute time-stamp. Hence, the document is first negatively time-stamped. Then, the document is positively time-stamped, and the resulting signature is fed back to a reference source so that it affects a subsequent negative time-stamp which is applied to the document at a later point in time during the creation of the document. This may go on for several or a large number of iterations. As the loop iterates is becomes increasingly impossible difficult to create a false time-stamp of the document.

The time-stamping signal according to the invention forms the basis for convenient, precise and large-scale digital negative time-stamping of documents, in which documents are time-stamped with time-stamping signal values as inputs.

In order to efficiently gain knowledge of a digital document's creation time, it is an advantage if the time-stamping process plays a part in the actual creation of the document. If the document is created in such a way so that the future value of the time-stamping signal will depend upon the process of creating the document, secure time-stamping verification will be possible despite the inherent characteristics of the digital domain, such as absolute stability and wide-ranging reversibility.

One particular class of documents that may be time-stamped using the present invention comprises digital images, in particular digital photographs. They have some significant properties, according to the following. Encoding and compression makes it non-trivial to change individual bits or add information without compromising the document's validity. Visual analysis will reveal non-realistic image manipulations. The higher the image resolution, the harder it gets to manipulate the document in a trustworthy manner. Visual elements in the photo that carry information can be accompanied with digitally stored meta information in the same document, or associated with the document in some sort of digital envelope. Verification of the correspondence of such metadata adds to the credibility of the time-stamping.

Image sequences, such as video, adds the additional possibility of using integrated time-stamps.

Hence, the invention is not limited to the disclosed embodiments, but can be modified within the full scope of the enclosed claims.

The invention claimed is:

1. A computer-implemented method of generating a time-stamped document, wherein the method comprises carrying out the following steps with a computer:
   a) sampling a current state of multiple sets of publicly published information, wherein a first set of publicly published information is externally available and generated such that information contained therein is not known before the first set of publicly published information is published;
   b) generating a digital representation of first sampled information as a digitally stored reference document having an accuracy that is verifiable by a third party by referencing the first set of publicly published information;
   c) inputting the digitally stored reference document to a one-way function, and determining a corresponding output value of the one-way function;
   d) updating a document time-stamping signal according to the output value of step c), the output value of step c) being determinable from the updated document time-stamping signal;
   e) iterating steps a) through d), wherein in each iteration of step b) a generated reference document is generated from at least one of second sampled information based on an updated current state sampled from the first set of publicly published information, or third sampled information based on a current state sampled from a second set of publicly published information, the second set of publicly published information is different from the first set of publicly published information and contains information that is not known before the second set of publicly published information is published; and
   f) generating a time-stamped document by incorporating, after any iteration defined in step e) of steps b) through d), the updated document time-stamping signal into a third-party document such that the incorporated time-stamping signal can be read from the third-party document.

2. The method according to claim 1, wherein each of the multiple sets of publicly published information is a publically published physical event.

3. The method according to claim 2, wherein each of the multiple sets of publicly published information is publically available video footage.

4. The method according to claim 1, wherein for some or all iterations of steps a) through d), a previous or a current value of the document time-stamping signal or a value derived therefrom is additionally input to the one-way function.

5. The method according to claim 1, wherein at least one iteration of steps b) through d) further comprises time-stamping a second document using a current value of the document time-stamping signal, and an additional input to the one-way function being at least a part of the time-stamped second document or an output value of a second one-way function applied to the time-stamped second document.

6. The method according to claim 1, wherein a current value of the document time-stamping signal is continuously or periodically published or sent to a receiver.

7. A method for creating a digital signature of a target document, comprising:
   a) sampling a current state of a first set multiple sets of publicly published information, wherein a first set of publicly published information is externally available and is generated such that information contained therein is not known before the first set of publicly published information is generated;
   b) generating a digital representation of the first sampled information as a digitally stored reference document having an accuracy that is verifiable by one or more third parties by referencing the first set of publicly published information;
   c) inputting the digitally stored reference document to a one-way function, and determining a corresponding output value of the one-way function;
   d) updating a document time-stamping signal according to the output value of step c), the output value of step c) being determinable from the updated document time-stamping signal;
   e) iterating steps a) through d), wherein in each iteration of step b) a generated reference document is generated from at least one of second sampled information based on an updated current state sampled from the first set of publicly published information, or third sampled information based on a current state sampled from a second set of publicly published information, the second set of publicly published information is different from the first set of publicly published information and contains information that is not known before the second set of publicly published information is published;
   f) inputting at least a part of a digitally stored version of the target document to a signature one-way function;
   g) inputting, after any iteration defined in step e) of steps b) through d), updated document time-stamping signal, or a value calculated therefrom, to the signature one-way function; and
   h) outputting the digital signature from the signature one-way function.

8. The method according to claim 7, wherein the digital signature, or a value which has been calculated based upon the digital signature, is publically published over at least one publication channel available to third parties.

9. The method according to claim 8, wherein digital signatures are calculated for a plurality of target documents at different times, the calculated signatures logically stored as leaves in a tree structure, a respective output value of a tree one-way function is calculated for each parent node in the tree structure, where the digital signatures and/or calculated tree one-way function output values of each respective child node for the parent node are used as input values for the tree one-way function, and a tree one-way function output value of a tree root, or a value which has been calculated based upon the tree one-way function output value, is publically published as a digital signature.

10. The method according to claim 7, wherein a random number is also used as an input value to the signature one-way function, and the random number is associated with at least one of the target document or a signature one-way function output value and stored.

11. The method according to claim 1, wherein sampling further comprises capturing at least one of the first sampled information, the second sampled information, or the third sampled information with sampling equipment configured for sampling a real-world physical phenomenon, wherein the sampling equipment is provided access to a communication channel over which a current value of the document time-stamping signal is communicated to the sampling equipment, and wherein generating the digitally stored reference document comprises embedding, by the sampling equipment, the current value of the document time-stamping signal into the digitally stored reference document while performing the sampling.

12. The method according to claim 1, wherein the digitally stored reference document comprises at least one still image, or one frame in a moving image, captured using an image capturing device, a value of the document time-stamping signal at the time of capturing the still image or frame is embedded into the still image or the frame by positioning a graphics-presenting device, arranged to show a graphical element in a still image view or a frame view of the image capturing device.

13. The method according to claim 1, wherein the digitally stored reference documents are frames of a video and a current value of the document time-stamping signal is embedded into the video frames at the time of capturing each frame.

14. The method according to claim 7, wherein a current value of the document time-stamping signal at the time of time-stamping of the target document is embedded into or associated with a time-stamped target document and the target document with embedded or associated value are stored.

15. The method according to claim 14, wherein the target document is a web page.

16. The method of claim 14, further comprising verifying integrity of a questioned document, wherein verifying comprises:
   i) time-stamping the target document with the current value of the document time-stamping signal;
   j) publishing the target document with a visibly embedded piece of information;
   k) receiving a depiction of the questioned document sent by a third party of the one or more third parties over a communication channel;
   l) deducing a value from an embedded piece of information visible in the received depiction;
   m) finding, if matching in a central server and based upon the deduced value, the target document previously time-stamped using a document time-stamping signal value; and
   n) if a document is found in the central server, communicating to the third party the target document itself and/or information pertinent to the target document.

17. The method of claim 14, further comprising verifying integrity of a document, digitally stored, which is published on the Internet and viewed using a web browser, wherein the verifying comprises:
   i) time-stamping the document with the current value of the document time-stamping signal;
   j) publishing the document on the Internet with associated programming code arranged to react upon a selection of or clicking on the document, or an activation of a user control;
   k) upon a detection of the selection of or the clicking on the document, or the activation of said user control, by a third party of the one or more third parties viewing the document, sending the document to a central server;
   l) upon receipt of the document therein, causing the central server to check that the received document matches the time-stamped document by calculating a corresponding digital signature of the received document and checking for a known document with the same digital signature; and
   m) if such a match is found, communicating to the third party information pertinent to the time-stamped document.

18. The method of claim 7, further comprising verifying integrity of a document, digitally stored, wherein the verifying comprises:
   at a first point in time, creating a digital proof signature of the document;
   storing the digital proof signature;
   at a later second point in time, verifying the integrity of the document by receiving a digital copy of the document, creating a digital verification signature of the received document using the same value of the document time-stamping signal used for the creation of the digital proof signature, and confirming the integrity of the received document only in case the digital proof signature is equal to the digital verification signature.

* * * * *